United States Patent [19]
Murphy

[11] Patent Number: 5,786,773
[45] Date of Patent: Jul. 28, 1998

US005786773A

[54] LOCAL-AREA AUGMENTATION SYSTEM FOR SATELLITE NAVIGATION PRECISION-APPROACH SYSTEM

[75] Inventor: Timothy Allen Murphy, Lynnwood, Wash.

[73] Assignee: The Boeing Company, Seattle, Wash.

[21] Appl. No.: 720,715

[22] Filed: Oct. 2, 1996

[51] Int. Cl.⁶ .................................................. G08G 5/00
[52] U.S. Cl. ..................... 340/947; 340/948; 340/979;
342/357; 342/352; 342/358; 342/33; 342/455;
342/456; 364/428; 364/449.7; 364/461
[58] Field of Search ............................. 340/947, 948,
340/951, 979; 342/357, 352, 353, 358,
356, 386, 33, 450, 455, 456, 453; 364/424.06,
428, 429, 449.7, 439, 460, 461, 462

[56] References Cited

U.S. PATENT DOCUMENTS

| | | |
|---|---|---|
| 4,652,884 | 3/1987 | Starker . |
| 4,866,450 | 9/1989 | Chisholm . |
| 5,017,930 | 5/1991 | Stoltz et al. . |
| 5,099,245 | 3/1992 | Sagey . |
| 5,148,179 | 9/1992 | Allison . |
| 5,311,194 | 5/1994 | Brown . |
| 5,323,322 | 6/1994 | Mueller et al. . |
| 5,344,105 | 9/1994 | Youhanaie . |
| 5,361,212 | 11/1994 | Class et al. . |
| 5,365,447 | 11/1994 | Dennis . |
| 5,420,592 | 5/1995 | Johnson . |
| 5,438,337 | 8/1995 | Aguado . |
| 5,440,491 | 8/1995 | Kawano et al. . |
| 5,557,284 | 9/1996 | Hartman .................... 342/357 |
| 5,570,097 | 10/1996 | Aguado ...................... 342/357 |
| 5,596,328 | 1/1997 | Stangeland ................. 342/357 |
| 5,600,329 | 2/1997 | Brenner ..................... 342/357 |
| 5,608,393 | 3/1997 | Hartman .................... 340/988 |
| 5,610,616 | 3/1997 | Vallot et al. ................ 342/357 |
| 5,627,546 | 5/1997 | Crow .......................... 342/352 |

Primary Examiner—Thomas Mullen
Assistant Examiner—Nina Tong
Attorney, Agent, or Firm—Christensen O'Connor Johnson & Kindness PLLC

[57] ABSTRACT

An aircraft local-area augmentation system that employs a differential global positioning system (GPS) to assist aircraft (102) landing is disclosed. One or more GPS ground stations (120), each including at least two GPS receivers (122) and a datalink transmitter (126), calculate and transmit GPS correction data to an aircraft (102). An aircraft (102) employs a GPS receiver (106) for receiving ranging signals (112) from GPS satellites (108), and a datalink receiver (116) for receiving GPS correction data and other information from a GPS ground station (120). The aircraft (102) further includes a data processor (110) for determining a global position of the aircraft (102) as a function of the aircraft GPS pseudorange data and the GPS correction data. The system minimizes the introduction of non-common errors by the use of double-differencing calculations using multiple combinations of satellite (108) and GPS ground station receiver (122). The system further comprises a method of transmitting a digital signature (626) from a GPS ground station (120) to an aircraft (102), in order to authenticate transmitted messages, thereby detecting spoofing. Messages transmitted from a GPS ground station (120) on a datalink (128) include an almanac message (930), providing data useful for locating other GPS ground stations (120), and a NOTAM message (940), providing satellite (108) status information. The airborne datalink receiver (116) includes an autonomous scanning mode that scans available datalink frequencies and time slots, searching for datalink signals (128). One or more optional pseudolite stations (130) employing a spread spectrum code sequence improve the accuracy and reliability of the system. The inclusion of an ILS glideslope frequency (952) in the datalink allows an airborne receiver to operate in a hybrid mode, combining a differential GPS determination of horizontal position with an ILS determination of altitude.

37 Claims, 13 Drawing Sheets

| 1 MSEC PERIOD | SLOT NO. | | | | | | | | | |
|---|---|---|---|---|---|---|---|---|---|---|
| | 1 | 2 | 3 | 4 | 5 | 6 | 7 | 8 | 9 | 10 |
| 1 | A | | | | | B | | | | |
| 2 | | A | | | | | B | | | |
| 3 | | | A | | | | | B | | |
| 4 | | | | A | | | | | B | |
| 5 | | | | | A | | | | | B |
| 6 | | | | | | A | | | | |
| 7 | B | | | | | | A | | | |
| 8 | | B | | | | | | A | | |
| 9 | | | B | | | | | | A | |
| 10 | | | | B | | | | | | A |
| 11 | | | | | B | | | | | |
| 12 | A | | | | | B | | | | |
| 13 | | A | | | | | B | | | |
| 14 | | | A | | | | | B | | |
| 15 | | | | A | | | | | B | |
| 16 | | | | | A | | | | | B |
| 17 | | | | | | A | | | | |
| 18 | B | | | | | | A | | | |
| 19 | | B | | | | | | A | | |
| 20 | | | B | | | | | | A | |
| 21 | | | | B | | | | | | A |
| 22 | | | | | B | | | | | |
| " | | | | | | | | | | |

*Fig. 11*

LOCAL-AREA AUGMENTATION SYSTEM FOR SATELLITE NAVIGATION PRECISION-APPROACH SYSTEM

FIELD OF THE INVENTION

The present invention relates to aircraft instrument navigation systems and, more particularly, to aircraft instrument navigation systems that assist the navigation of an aircraft during approach and landing.

BACKGROUND OF THE INVENTION

Modern aircraft employ landing navigation systems to assist a pilot in maintaining an aircraft along a predetermined glide path associated with a particular landing strip or runway. Commercial aircraft commonly incorporate an Instrument Landing System (ILS) or a Microwave Landing System (MLS). ILS systems suffer from several problems, including RF interference from nearby FM broadcasting stations and guidance beam distortions due to increased development in airport environs. Economic concerns have limited the acceptance of MLS systems.

A Global Positioning System (GPS) employs spaced-apart satellites in circular orbits at locations that are readily available to the public. One reference for satellite information is the *Interavia Space Directory* (1990–1991), available from James Information Group, which contains the nominal orbital locations of GPS satellites. GPS satellites continuously broadcast signals that may be received by anyone with the proper equipment. The GPS satellite signals contain ephemeris data that precisely describes the orbits of the satellites. GPS operates on the principle of multilateration, wherein a GPS receiver makes range measurements based on the GPS signals generated by multiple satellites. The range from a satellite is determined by measuring the satellite signal transmission and receiving time in conjunction with a clock synchronized to the satellite's clock, and calculating the distance from a specified position of the satellite at the transmission time. The specified satellite position is obtained from the broadcast ephemeris data. The intersection of the multiple range measurements made simultaneously is used to ascertain latitude, longitude, and altitude. Range measurements from at least three sources are necessary to ascertain a position in three-dimensional space.

Each range measurement contains an error called an offset bias, created by the unsynchronized operation of the satellite and user clocks. This error will yield an erroneous range measurement, making it appear that the user is either closer to or farther from each of the satellites, as compared with the true distance. These measurements are therefore more accurately termed pseudoranges.

An additional error is introduced by the content of the GPS satellite transmission itself. Each GPS satellite transmits an encrypted signal for military use and a degraded, unencrypted signal for civilian use. The unencrypted signal used by commercial aircraft may introduce errors from zero meters to 100 meters or more. Physical factors also introduce uncertainty in range calculations. Atmospheric propagation delays and multipath interference are two such major factors.

One technique for reducing the effects of the error in a GPS utilizes differential corrections for the pseudoranges measured by a GPS receiver to eliminate common errors, namely, offset biases. Differential corrections can be determined by placing a GPS ground station receiver at a precisely known, fixed reference site, and determining pseudoranges to GPS satellites. Actual errors are then determined by comparing the calculated pseudoranges with the values expected for the known reference site. The differences between the received and expected values are then transmitted to the GPS receiver over a separate datalink to enable the receiver to correct pseudorange measurements before the position of the receiver is computed.

Some errors are not common between a GPS receiver located onboard an aircraft and a ground station, and therefore cannot be totally compensated for by differential correction. For example, atmospheric propagation delay errors and satellite position error vary as the distance between the aircraft and the reference site increases, and therefore are not common to all measurements. Multipath and delays caused by a receiver's hardware and receiver tracking loop noise also cause non-common errors.

A fixed differential GPS (DGPS) ground station used in an aircraft landing environment typically includes a datalink signal transmitter for transmitting GPS correction data and approach data associated with a particular landing strip. Approach data includes the identity of the approach and coordinates that sufficiently describe the desired flight path for the approach to the landing strip.

Current systems offering DGPS for private use are built to a Requirements and Technical Consideration for Aeronautics (RTCA) standard known as "Special Category I" (SCAT I), which is documented in RTCA document DO-217. The SCAT I system uses a datalink situated in the VHF navigation band (112 to 118 MHz). One shortcoming of SCAT I is that it lacks precisely specified performance standards on interfaces necessary to support interoperability. This makes it difficult for manufacturers to build equipment to a standard such that the equipment will work with any ground station equipment.

DGPS that use of one or more pseudolites to augment satellite GPS have been proposed for implementation in aircraft landing systems. A pseudolite consists of a ground-based station with a transmitter that transmits signals similar to those transmitted by a GPS satellite. An aircraft can combine the range measurements calculated from pseudolite signals with satellite range measurements to further reduce errors.

One disadvantage of a DGPS is its vulnerability to spoofing, which is the intentional transmission of false signals in order to sabotage a navigational system. The transmission of a false datalink signal with erroneous corrections can be interpreted by an airborne receiver as a genuine datalink signal from a GPS ground station. If this occurs, the airborne receiver would apply erroneous corrections and derive erroneous position coordinates. Thus, a DGPS system that distinguishes authentic signals from nonauthentic signals is desirable.

DGPS requires that airborne receivers have the ability to locate ground stations. Currently, this is done by using an onboard database specifying the location of ground stations en route. The aircraft must also know of all functioning satellites to be used en route. Occasionally, satellite outages are planned, for maintenance or other reasons. A Notice to Airmen (NOTAM) contains information regarding planned satellite outages, and is provided to the aircraft operator prior to dispatch, for planning purposes. The GPS satellites are in constant motion. Satellites are regularly going in and out of service because of planned maintenance or unplanned failures of satellite components. To ensure that continuity of the guidance function is not interrupted during critical operations, a user needs some means of predicting the ability of the system to provide adequate performance at a specified time in the future. When routine maintenance results in the removal of a satellite from service, the user can benefit from foreknowledge of this event when predicting future performance of the system. Such information is important, for example, when weather conditions make the use of the DGPS critical. Thus, a DGPS that improves the method for obtaining information pertaining to the location of ground stations and planned satellite outages is also desirable.

SUMMARY OF THE INVENTION

In accordance with this invention, a local-area augmentation system for GPS designed to assist the navigation of an aircraft during approach and landing and a related method are provided. The preferred form of the local-area augmentation system utilizes a network of Global Positioning System (GPS) satellites spaced apart in circular orbits about the earth, and includes one or more GPS ground stations positioned at a fixed location on the ground, and, optimally, one or more pseudolites positioned at a fixed location on the ground, communicating with an aircraft flying above the earth. The GPS satellites transmit ranging signals, which are used to determine the range of the aircraft, the ground stations, and the pseudolites from the selected satellites. The GPS ground station(s) includes multiple receivers for receiving the GPS satellite ranging signals, a data processor, and a transmitter for transmitting datalink signals containing correction information to the aircraft. The GPS ground station receivers measure a pseudorange to each satellite, and determine the error associated with the pseudoranges as the deviation between the pseudoranges and the known distance between the satellites and the ground station receivers. The error consists of common-mode errors, which are errors that are common between a GPS ground station and an aircraft, and non-common mode errors, which are errors unique to a particular combination of satellite and receiver. A datalink signal containing the error information is transmitted to the aircraft, to be used by the aircraft in correcting the aircraft's own pseudoranges to each GPS satellite.

In accordance with further aspects of this invention, in order to increase the accuracy of the correction information, the GPS ground station filters out unacceptable pseudorange measurements prior to transmitting a datalink signal containing correction information. More specifically, a ground station determines multiple pseudoranges, each pseudorange corresponding to a unique combination of a ground station receiver and a GPS satellite. Utilizing, for example, a set of four pseudoranges corresponding to the four possible combinations of two receivers and two satellites, the GPS ground station data processor determines single differences between the pseudoranges corresponding to combinations having a common receiver, and a second single difference determined by calculating the difference between the remaining two pseudoranges of the set. The two single differences are then subtracted from each other, resulting in a double difference. By calculating multiple double differences, and combining the double differences in a manner that amplifies errors pertaining to a single combination of one GPS satellite and one GPS ground station receiver, the data processor detects unusually large non-common errors. In accordance with the invention, in order to increase the accuracy of the error information and, therefore, the accuracy of the correction data transmitted to the aircraft, pseudoranges that include non-common mode errors exceeding a predetermined threshold are discarded. As a result, the aircraft more accurately determines its ranges from the GPS satellites and, therefore, its own position relative to the earth.

In accordance with other aspects of this invention, the GPS ground station data processor produces a digital signature that authenticates the ground station's datalink signal. The ground station's datalink signal that contains the differential correction information includes the digital signature. The digital signature is created by encrypting data that is included in the transmitted datalink signal, and includes data formed from the correction information. Preferably, the data is first transformed into a digest of data, and the digest of data is encrypted to form the digital signal. The preferred method of encrypting the data utilizes a public key cryptosystem, the ground station data processor employing a private key to encrypt the data, and the aircraft data processor employing a corresponding public key to decrypt the digital signature and authenticate the datalink signal.

In accordance with still other aspects of this invention, the GPS ground station includes a secure database comprising read-only memory containing data pertaining to the ground station and an application-specific integrated circuit (ASIC) containing the private key. Preferably, the ASIC is designed in a manner such that critical information cannot be obtained from it, and the ASIC is destroyed if the ASIC is improperly removed.

In accordance with yet other aspects of this invention, the datalink signal transmitted by a GPS ground station includes data pertaining to a second GPS ground station. Specifically, this data includes the transmission signal frequency and location of the second GPS ground station. This information is used by aircraft to enhance an aircraft's ability to find GPS ground stations' datalink signals.

In accordance with other further aspects of this invention, the datalink signal transmitted by a GPS ground station includes status information representative of the status of one or more GPS satellites, the status information including such data as the time and duration of shutdown of a satellite.

In accordance with yet still other aspects of this invention, the local-area augmentation system includes one or more pseudolites positioned at fixed locations on the ground. A pseudolite includes a transmitter, and transmits ranging signals capable of being used by an aircraft to determine pseudoranges from the pseudolites. Each pseudolite transmits signals during a unique time slot synchronized with the time slots employed by other pseudolites, in order to avoid interference of signals by multiple pseudolites. Preferably, the pseudolites transmit signals using a spread-spectrum code rate or chipping rate considerably above the standard GPS chipping rate of 1 MHz. A frequency of 10 MHz is preferred.

In accordance with yet still further aspects of this invention, the local-area augmentation system includes an aircraft receiver located on the aircraft for receiving datalink signals transmitted from a GPS ground station. The aircraft receiver automatically scans a plurality of frequencies and time slots in order to locate datalink signals from a GPS ground station.

In accordance with still other further aspects of this invention, the datalink signal transmitted by a GPS ground station includes the frequency for the instrument landing system glideslope transmitter situated at the runway. This information supports a hybrid ILS/DGPS mode of landing, in which horizontal guidance is obtained from the DGPS and vertical guidance is obtained from the ILS glideslope. Utilizing this information, an aircraft ILS glideslope receiver can be automatically tuned, thereby avoiding an additional pilot action.

As will be readily appreciated from the foregoing description, a local-area augmentation system formed in accordance with the invention provides accurate differential GPS correction information to an aircraft. The aircraft receiver, employing techniques well known in this art, combines the differential correction information with pseudoranges between the aircraft receiver and GPS satellites, in order to accurately determine the position of the aircraft. The use of pseudolites further increases the accuracy of the aircraft's determined position. The transmission of pseudolite signals in accordance with the invention improves the reception of the pseudolite signals at an aircraft receiver, and, in particular, allows the use of a single aircraft receiver to receive ranging signals from GPS satellites and pseudolites. The transmission of datalink signals containing information pertaining to other GPS ground stations and GPS satellites provides more current information regarding the GPS ground stations and satellites, thereby improving reception of signals, advance planning, and automation of signal reception. The utilization of digital signatures in datalink signals increases the security of the differential GPS system.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 11 is a time schedule illustrating the synchronization of pseudolite transmission by the use of TDMA time slots.

DETAILED DESCRIPTION OF THE PREFERRED EMBODIMENT

Figure 1:
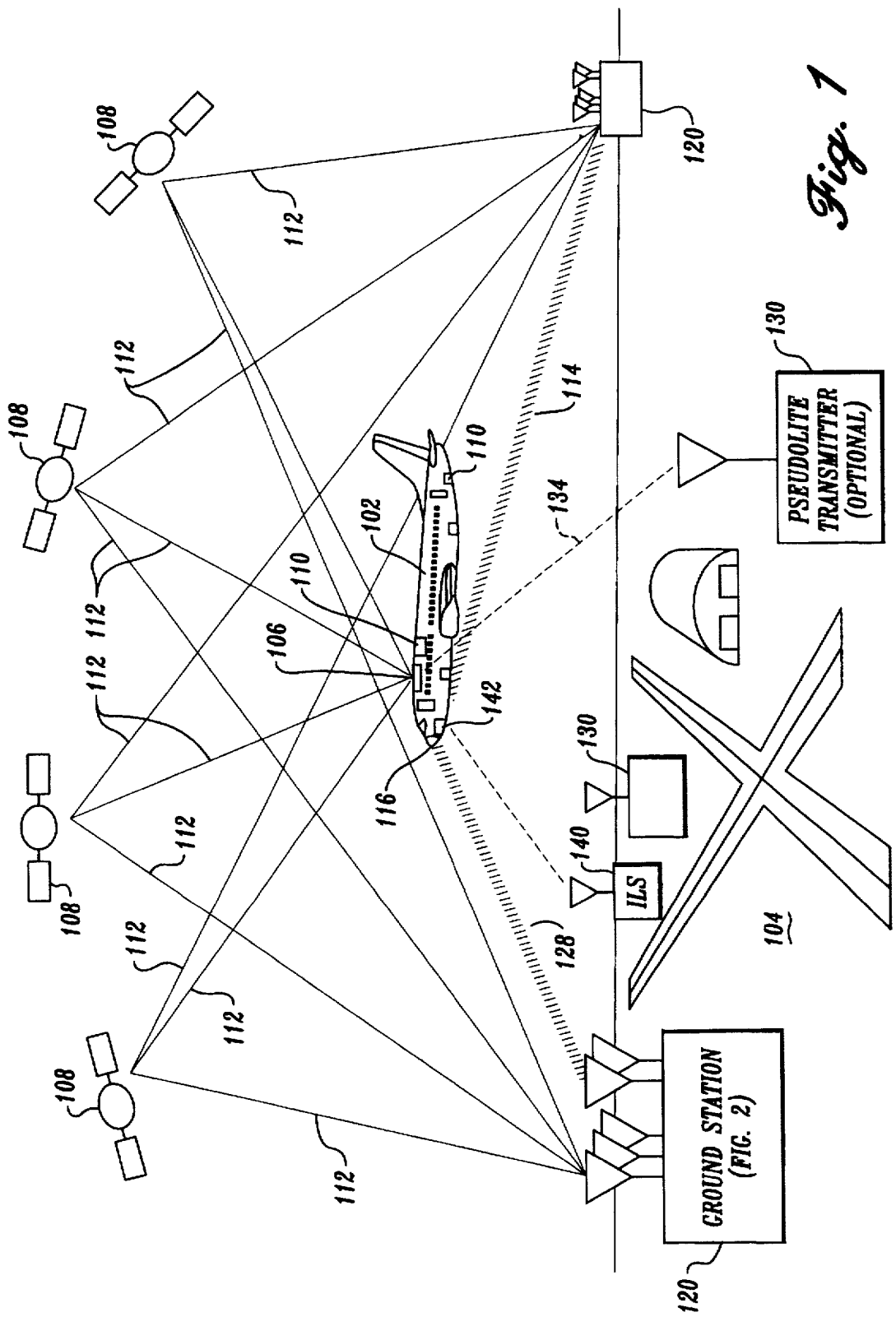
FIG. 1 is a pictorial diagram illustrating a local-area augmentation system according to the invention.

FIG. 1 is a pictorial diagram illustrating the major components of a preferred embodiment of a local-area augmentation system formed in accordance with the invention in combination with an aircraft 102, shown flying above the surface of the earth 104, and a plurality of GPS satellites 108 located in orbit above the earth. The system comprises one or more GPS ground stations 120 located on the ground, and generally positioned in proximity to an airport; and one or more optional pseudolites 130 located on the ground.

The GPS satellites 108 are positioned and spaced apart so that the aircraft 102 flying at any position above the earth is in direct line of sight of at least four GPS satellites 108. The GPS satellites 108 transmit GPS ranging signals 112, the ranging signals 112 being available for reception by the aircraft 102 or the GPS ground station 120. A constellation of GPS satellites 108 refers to the subset of satellites 108 that are capable of having their ranging signals 112 received by the aircraft 102 and the GPS ground station 120 at a given time. Thus, the four GPS satellites 108 shown in FIG. 1 make up the relevant satellite constellation for the illustrated aircraft 102.

Figure 2:
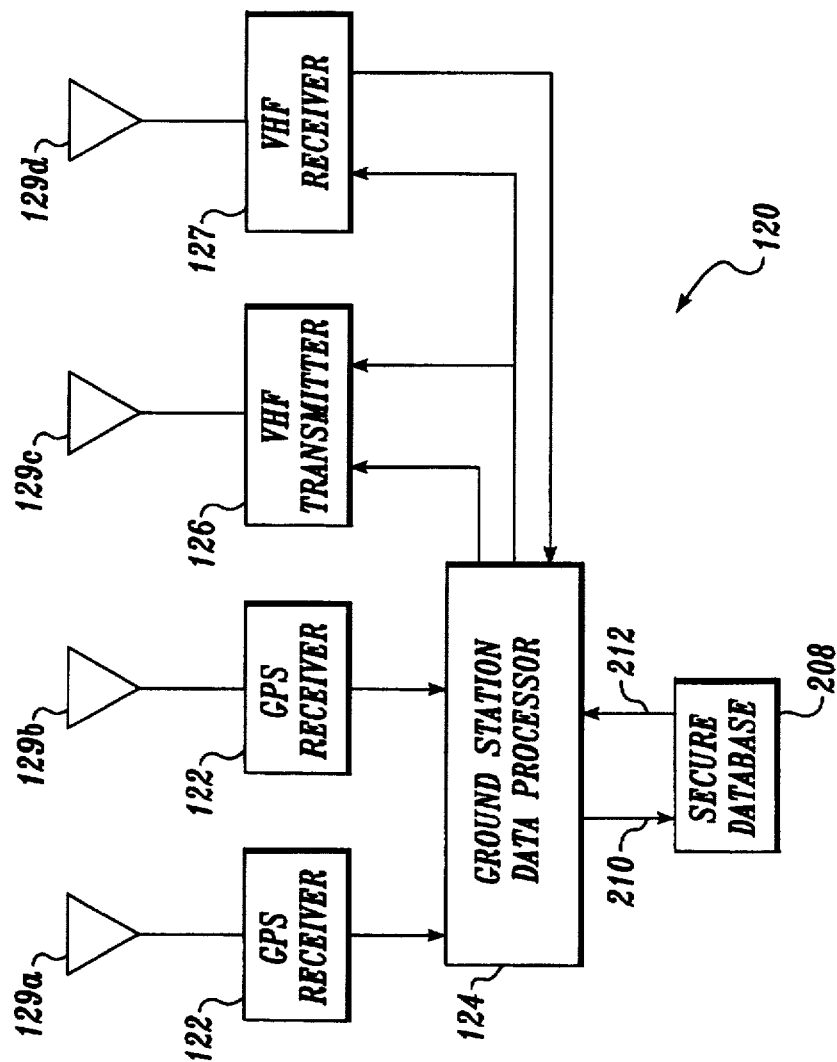
FIG. 2 is a block diagram of a GPS ground station formed in accordance with the invention for receiving and processing GPS satellite signals and transmitting datalink signals to an aircraft.

The GPS ground stations 120 are located at a fixed position on the ground. As shown in FIG. 2, each GPS ground station 120 includes a plurality of receivers 122 operative for receiving the satellite ranging signals 112 transmitted by the GPS satellites 108. Each GPS ground station 120, discussed in detail below, further includes: a ground station data processor 124 operative for processing received satellite ranging signals 112; a VHF transmitter 126 for transmitting a datalink signal 128 to the aircraft 102; and a VHF receiver 127 for receiving a datalink signal 128 from the VHF transmitter 126, a pseudolite transmitter 132, and VHF transmitters of other ground stations 120. The GPS receivers 122, the VHF transmitter 126, and the VHF receiver are connected to suitable antennae 129a, 129b, 129c, and 129d.

Figure 10:
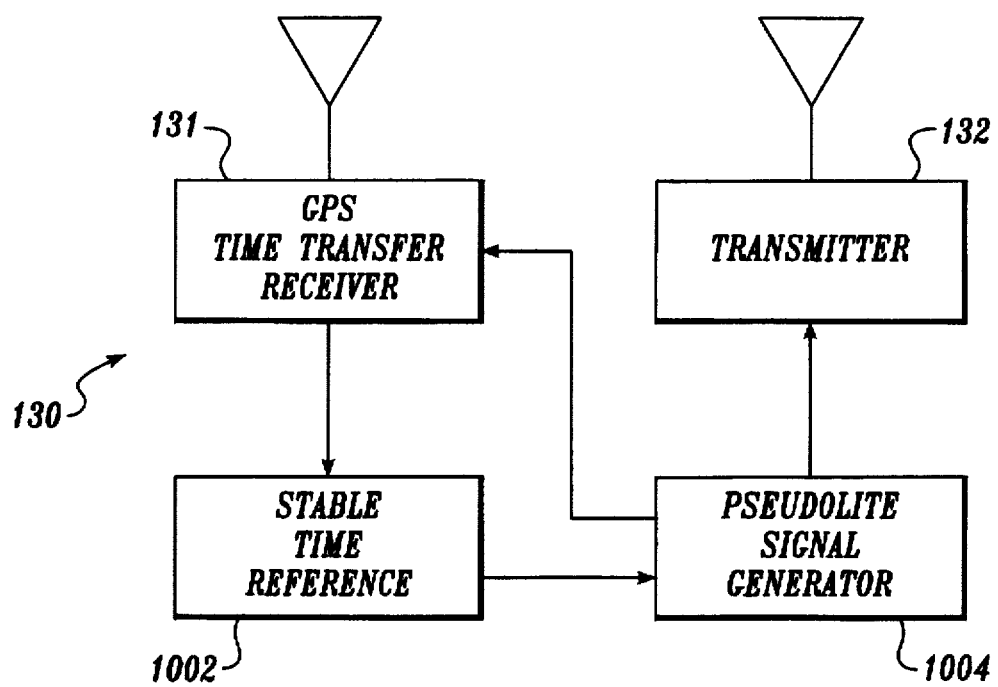
FIG. 10 is a block diagram of a pseudolite formed in accordance with the invention.

As shown in FIG. 10 and described in detail below, each pseudolite 130, includes a GPS time transfer receiver 131 and a transmitter 132 that transmits ranging signals 134 similar to the ranging signals 112 transmitted by a GPS satellite 108. The ranging signals 134 are capable of reception by an aircraft 102 or a GPS ground station 120.

Referring to FIG. 1, the aircraft 102 carries a global positioning system (GPS) receiver 106 (represented by a block for convenience of illustration) capable of receiving ranging signals 112 from the GPS navigation satellites 108 and ranging signals from the pseudolite(s) 130. The aircraft 102 further includes a data processor 110 (also represented by a block) operative for processing received GPS satellite signals 112. The aircraft 102 further includes a data link receiver 116 operative for receiving the data link signal 128 from the GPS ground stations 120. As explained in more detail below, the aircraft data processor 110 combines the information received from the GPS ground stations 120 with the ranging data confirmed in the GPS satellite signals 112 to determine the position of the aircraft 102.

Since the operation of GPS in an aircraft environment is well known in the art, the details of such systems are not described here. Briefly, each of the GPS satellites 108 transmits a ranging signal 112 consisting of a coded signal that originates from the satellite at a specific moment in time. The aircraft's GPS receiver 106 receives the coded signal and determines the time of reception. The aircraft's data processor 110 determines the distance between each GPS satellite 108 and the GPS receiver 106 located on an aircraft 102 by measuring the ranging signal transmission and reception time in conjunction with a clock (not shown) located onboard the aircraft, and multiplying by the propagation speed of the ranging signal 112. The resultant measurements are commonly referred to as pseudoranges, due to the inherent offset between the satellite clock and the user clock, and the degree of uncertainty resulting from the introduction of errors as discussed in the Background of the Invention. Determining pseudoranges from at least four GPS satellites 108, and using knowledge of the satellites' locations, allows the aircraft data processor 110 to use multilateration to determine the time offset between the satellite clock and the user clock, and determine the position of the GPS receiver 106, and therefore the aircraft 102, relative to the earth.

The operation of a differential GPS (DGPS) is also well known in the art. Briefly, a GPS ground station receiver 122 is placed at a precisely known, fixed reference site. The GPS ground station receiver 122 calculates pseudoranges to one or more GPS satellites 108. An error is determined for each pseudorange by determining the differences between the pseudorange and the actual range, the actual range being determinable from the known positions of the GPS ground station 120 and the GPS satellite 108. The errors, or differential corrections are transmitted to the aircraft 102, which uses the error data to correct the aircraft's pseudoranges to the identical satellites 108.

Ground Station

As illustrated in FIG. 2, and described above, each ground station 120 comprises at least two GPS receivers 122, a ground station data processor 124, one VHF transmitter 126, and one VHF receiver 127. Each GPS ground station also includes a secure data base 208, further described below. The VHF transmitter 126 transmits the datalink signal 128 (FIG. 1) to the aircraft 102. The VHF receiver 128 receives the datalink signal 128 transmitted by the related ground station 120 and by other nearby ground stations 120. As will be better understood from the following description, the reception of datalink signals 128 by a GPS ground station receiver 128 allows a ground station 120 to monitor the integrity of its own transmissions.

A number of variations of the GPS ground station architecture are possible. Different architectures may be used to satisfy the different required levels of system performance. Landing system performance is typically classified according to "categories" that are defined within various federal aviation standards, technical orders, and advisory circulars. For example, see FAA Advisory Circular AC 120-28D. The present invention uses classes of ground stations that represent architectures designed to meet the requirements of various categories of landing systems. For example, a Class 0 ground station supports en route, nonprecision navigation, but does not meet the requirements for any category of precision approach. A Class 1 ground station meets the required performance to support category I (or CAT I) precision approach and so forth. All classes of ground stations are built up from common modular components. Higher classes of ground stations include increasing numbers of redundant elements. The higher classes are better able to sustain equipment failures without disrupting operation.

In Class 0, for example, there is no tolerance for equipment failure. Any such failure results in a loss of station operation. In Class 1, a ground station can sustain a loss of a VHF transmitter or receiver and continue to remain a Class 1 ground station.

As illustrated in FIG. 1, the receivers 122 of the GPS ground stations 120 receive GPS ranging signals 112 from the GPS satellites 108. The ground station 120 is programmed with a priori information regarding the position of the ground station receiver antennas 129a and 129b. Knowing the true position of the ground station receiver antennas 129a and 129b, the ground station 120 can compute the range between the ground station receiver antenna and the indicated position of the satellite 108 as derived from the ephemeris data contained within the navigation message broadcast by the satellites 108. This computed range is then subtracted from the measured pseudorange for each satellite 108 to form a pseudorange correction. This information is included in the ground station messages transmitted through the datalink signals 128 to the aircraft 102. The aircraft data processor 110 subsequently uses the pseudorange correction to adjust its measured pseudoranges. The connector pseudoranges are then used in the calculation of the position of the aircraft 102.

As illustrated in FIG. 2, and noted above, the GPS ground stations 120 also include a secure database 208. The secure database of each ground station is electronically connected to the ground station data processor 124. The content and operation of the secure database 208 are described in more detail below. Briefly, the secure database 208 contains information for identifying the calculated ground station 120, and generating data signature signals using private key data, that uniquely identifies the ground station. Digital signatures are used to authenticate signals, and, thereby aid in the prevention of false datalink signals corrupting the navigation system.

Figure 3:
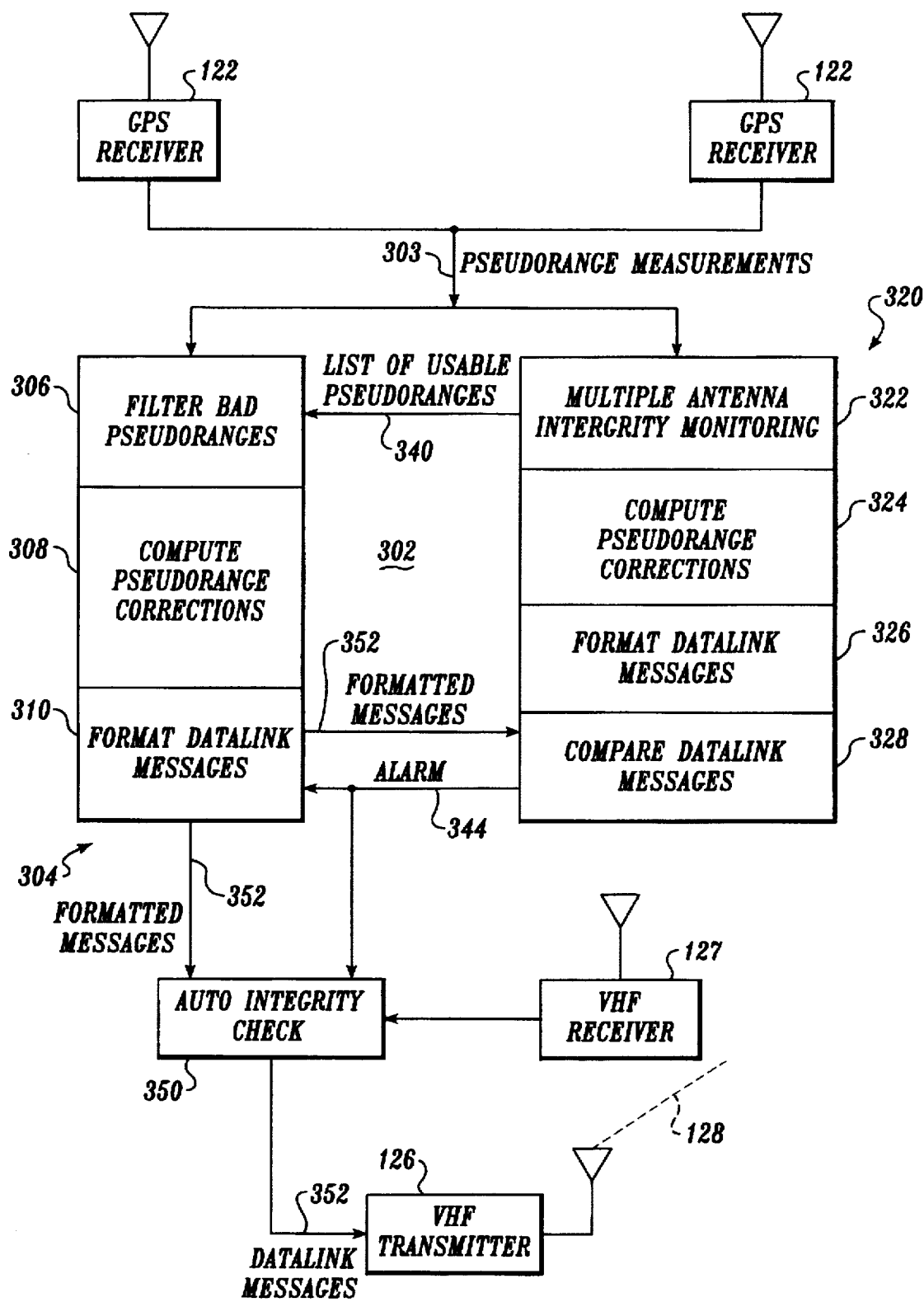
FIG. 3 is a block diagram illustrating the processing of information in a GPS ground station formed in accordance with the invention.

FIG. 3 is a block diagram illustrating the processing of information within a GPS ground station 120 in accordance with the invention. Ground station processing includes: managing the GPS information from the ground station receivers 122; computing pseudoranges and pseudorange correction data for each ground station receiver 122; and deriving a single set of correction data to be broadcast by the ground station transmitter 126 via the datalink signal 128. Ground station processing 302 also includes formatting the datalink messages and verifying the data received by the VHF receiver 127, sometimes called a datalink monitor. A CLASS 0 GPS ground station 120, shown in FIG. 2, contains exactly one ground station processing channel 302. Higher classes of ground stations have multiple ground station processing channels that cooperatively manage, in a redundant manner, the processing of data by the ground stations 120, implementing continuous integrity monitoring.

To further the design goal of improving system integrity, the ground station processing channel has separate redundant processing. More specifically, as illustrated in FIG. 3, preferably each ground station processing channel 302 includes three processing units. The processing units consist of a differential processor 304, an integrity processor 320, and an automatic integrity check unit 350. All differential computations are carried out by both the differential processor 304 and the integrity processor 320, and the results are compared in the integrity processor 320. Additionally, the integrity processor 320 performs consistency checks on the data at various stages of the computations to detect problems with the measurements, such as excessive multipath or satellite failures. Watchdog circuits and periodic interrupts (not shown) monitor the operational status of the differential processor 304 and the integrity processor 320.

FIG. 3 illustrates the processing that occurs in the differential processor 304. The differential processor 304 receives pseudorange measurements 303 from each of the GPS ground station receivers 122. The three major processes that are performed by the differential processor 304 are illustrated. In process 306, the differential processor 304 filters out bad pseudoranges 303, according to a list of usable pseudoranges 340 provided by the integrity processor 320. Using the remaining pseudorange measurements 303, the differential processor 304 computes pseudorange corrections 308, as discussed above, i.e., the differential processor compares calculated position of the ground station receivers with the known (stored) position of the receiver antennas 129a and 129b. Then, the differential processor 304, in process 310, also formats datalink messages 352 to be transmitted via datalink signal 128 to the aircraft 102 (FIG. 1). The formatted datalink messages 352 are passed to the integrity processor 320 for comparison, and to the auto integrity check processor 350.

As illustrated in FIG. 3 and briefly noted above, the integrity processor 320 performs some processes that are redundant with processes performed by the differential processor 304. Specifically, the integrity processor 320 computes pseudorange corrections 324, and in process 326, formats datalink messages 352, the two processes being redundant of corresponding processes 308 and 310 in the differential processor 304. The integrity processor 320 also performs additional processes specific to the verification of integrity. Multiple-antennae integrity monitoring 322, described in detail below, determines which, if any, of the pseudorange measurements 303 are unusable due to the introduction of unacceptable error. A list of usable measurements 340 is passed from the integrity processor 320 to the differential processor 304 for use in filtering out unusable pseudoranges, in process 306. The integrity processor computes pseudorange corrections 324 based on the usable pseudorange measurements.

The integrity processor 320 verifies the integrity of formatted messages prior to transmission, by receiving formatted datalink messages 352 from the differential processor 304 and, in process 328, comparing the formatted datalink messages with those messages formatted within the integrity processor 320, in process 326. If an unsuccessful comparison occurs, an alarm signal 344 is sent to the differential processor 304 and the auto integrity check processor 350, to prevent the transmission of an invalid message. The auto integrity check processor 350 passes formatted datalink messages 352 to the VHF transmitter 126 if and only if the messages are found to be valid by the integrity processor 320, in process 328.

In order to detect latent failures of the integrity processor, the automatic integrity check processor 350 may periodically instruct the differential processor 304 to inject faults into the data provided to the integrity processor 320. The automatic integrity check processor 350 then verifies that the integrity processor 320 responded appropriately to the erroneous data by initiating an alarm signal 344.

Multiple-Antenna Integrity Monitoring

Referring again to FIG. 1, in a differential global positioning system, a loss of integrity occurs when a significant error that is not common to the GPS ground station 120 and the aircraft 102 occurs. Such an error is referred to as a non-common mode error. In accordance with the invention, the GPS ground station 120 uses Multiple Antennae Integrity Monitoring (MAIM) to monitor for unacceptably large non-common mode errors and remove them before they corrupt the computation of the differential corrections. By the use of MAIM, the invention minimizes errors in each pseudorange correction.

An arbitrary code-phase pseudorange measurement between a GPS ground station receiver 122 and a GPS satellite 108, with its associated errors, can be represented by the following equation, where i and j represent indices of the GPS ground station receivers 122 and the GPS satellites 108, respectively:

$$\rho_{ij} = R_{ij} + c\delta T_i - c\delta T_j + d_{j\text{-}tropo} + d_{j\text{-}iono} + URE_j + SA_j + d_{ij\text{-}hw} + d_{ij\text{-}noise} + d_{ij\text{-}mp} \quad (1)$$

where:

$\rho_{ij}$ is the code-phase (i.e., the pseudorange) measurement between the ith receiver and jth satellite;

$R_{ij}$ is the true line-of-sight range between the antennae for receiver i and satellite j;

c is the speed of light;

$\delta T_i$ is the receiver clock offset from system time for the ith receiver;

$\delta T_j$ is the satellite clock offset from system time for the jth satellite;

$d_{j\text{-}tropo}$ is the apparent signal path increase due to troposphere for the jth satellite;

$d_{j\text{-}iono}$ is the apparent signal path increase due to ionosphere for the jth satellite;

$URE_j$ is the unintentional satellite clock and orbit uncertainty;

$SA_j$ is the selective availability;

$d_{ij\text{-}hw}$ is the receiver hardware delay for the ith receiver;

$d_{ij\text{-}noise}$ is the receiver tracking loop noise for the ith receiver and jth satellite; and $d_{ij\text{-}mp}$ is the apparent signal path increase due to multipath.

The error terms in equation (1) above can be divided into two basic groups: 1) errors that are common to a particular satellite; and 2) errors that depend on a particular satellite/receiver pair. This division of errors can be represented by the following equations:

$$prc_j = c\delta T_j + d_{j\text{-}tropo} + d_{j\text{-}iono} + URE_j + SA_j \quad (2)$$

$$v_{ij} = d_{ij\text{-}hw} + d_{ij\text{-}noise} + d_{ij\text{-}mp} \quad (3)$$

where:

$prc_j$ represents all the common mode errors for the jth satellite; and $v_{ij}$ includes all of the non-common mode errors.

By the very nature of differential processing, the common mode errors ($prc_j$) are precisely the errors to be eliminated. Hence, pseudorange corrections broadcast to the aircraft 102 should be the best possible estimate of the combination of these errors.

The non-common mode errors ($v_{ij}$) are the errors that cause the estimate of $prc_j$ to be inaccurate. In a differential GPS, an undetected large non-common mode error is considered an integrity failure. The invention detects large non-common mode errors, as described below, thereby reducing the probability of an integrity failure.

Using equations (2) and (3), equation (1) can be rewritten:

$$\rho_{ij} = R_{ij} + c\delta T_i + prc_j + v_{ij} \quad (4)$$

The precise position of both the GPS ground station receiver 122 antennae and the satellites 108 are known. Therefore, $R_{ij}$ can be computed and subtracted from the raw pseudorange correction to form the pseudorange residual $\delta \rho_{ij}$ for the ith receiver and jth satellite as follows:

$$\delta \rho_{ij} = \rho_{ij} - R_{ij} = c\delta T_i + prc_j + v_{ij} \quad (5)$$

Differential processing attempts to determine the best possible estimate of $prc_j$. When forming this estimate, errors in the estimate of $\delta T_i$ are included in all the pseudorange corrections. Since this residual error source is common to all corrected pseudoranges at the aircraft GPS receiver 106, the entire effect of the error is projected into estimates of the airborne clock error. The non-common mode errors, $v_{ij}$, cause errors in estimates of $prc_j$ that are not common to all the corrections and therefore will project into the position states in an aircraft receiver. MAIM estimates the size of all non-common mode error components and attempts to prevent large non-common mode errors from degrading the estimates of $prc_j$.

Figure 4:
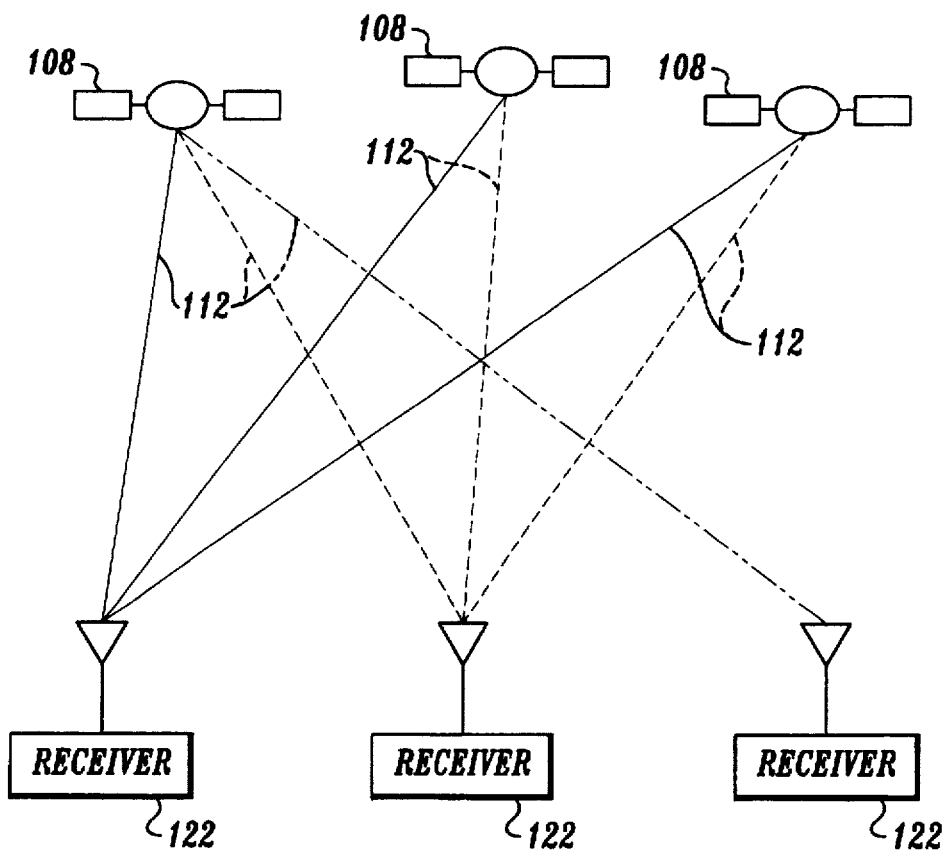
FIG. 4 is a pictorial diagram showing combinations consisting of a satellite, receiver pair, as used in the invention.

Differences between the pseudoranges from two different satellites can be calculated as follows. Referring to FIG. 4, the difference of the pseudorange between the ith GPS ground station receiver 122 and the jth satellite 108, and the pseudorange between the ith GPS ground station receiver 122 and the kth satellite 108 can be represented as:

$$\delta\rho_{ij} - \delta\rho_{ik} = \Delta\rho_{jk}^i = c\delta T_i + prc_j + v_{ij} - (c\delta T_i + prc_k + v_{ik}) = prc_j - prc_k + v_{ij} - v_{ik} \quad (6)$$

Note the resultant "single difference" no longer contains the receiver clock offset error term $c\delta T_i$. It has been canceled out in the differencing. Taking the difference between two single differences and using the same satellites 108 but different GPS ground station receivers 122 gives a double difference. The double difference formed from the pseudoranges between the ith and mth ground station receivers 122 and the jth and kth satellites 108 can be represented as:

$$\Delta\rho_{jk}^i - \Delta\rho_{jk}^m = \nabla\Delta\rho_{jk}^{im} = prc_j - prc_k + v_{ij} - v_{ik} - (prc_j - prc_k + v_{mj} - v_{mk}) = v_{ij} - v_{ik} - v_{mj} + v_{mk} \quad (7)$$

The resultant "double difference" contains no common mode errors or receiver clock offset terms. The double difference is composed entirely of non-common mode error sources. For N ground station receivers 122 and M satellites 108, there will nominally be N*M pseudorange measurements. Double differences require pairs of satellites 108 and receivers 122. Therefore, the number of double differences that can be computed, given N receivers 122 and M satellites 108, is the product of all possible sets of two satellites multiplied by all possible sets of two receivers, and is shown by the following equation, where NDD is the number of double differences:

$$NDD = C_2^N C_2^M = \frac{N!}{2!(N-2)!} * \frac{M!}{2!(M-2)!} \quad (8)$$

The double differences as given by equation (8) are not all independent. The number of independent double differences is given by:

Number of independent double differences=$(N-1)(M-1)$ (9)

There are always more unknowns (non-common mode errors) than independent equations (independent double differences). Therefore, it is not possible to use the double differences to directly solve for the non-common mode errors. However, observation of the double differences can be used to detect the presence of one or more large non-common mode errors. Furthermore, given the large number of redundant (but dependent) observations, it is possible to isolate measurements containing a large non-common mode error.

The following vectors can be defined:
Residual pseudorange vector:

$$\overline{\delta\rho} = [\delta\rho_{ij}] = [\delta\rho_{11}\delta\rho_{12} \cdots \delta\rho_{1M}\delta\rho_{21} \cdots \delta\rho_{NM}]^T \quad (10)$$

Double difference vector:

$$\overline{\nabla\Delta\rho} = [\nabla\Delta\rho_{12}^{12}\Delta\nabla\rho_{12}^{13} \cdots \nabla\Delta\rho_{12}^{1N}\nabla\Delta\rho_{13}^{11} \cdots \nabla\Delta\rho_{1M}^{1N}]^T \quad (11)$$

Error vector (non-common-mode errors):

$$\overline{v} = [v_{ij}] = [v_{11}v_{12} \cdots v_{1M}v_{21} \cdots v_{NM}]^T \quad (12)$$

It is possible to build a "differencing matrix" that, when multiplied by the residual pseudorange vector, produces the double difference vector:

$$\overline{\nabla\Delta\rho} = P\overline{\delta\rho} = P\overline{v} \quad (13)$$

An example of the differencing matrix for N=3 receivers and M=4 satellites is given below:

$$\overline{\nabla\Delta\rho} = P\overline{\delta\rho} = \quad (14)$$

$$\begin{bmatrix} \nabla\Delta\rho_{12}^{12} \\ \nabla\Delta\rho_{13}^{12} \\ \nabla\Delta\rho_{14}^{12} \\ \nabla\Delta\rho_{23}^{12} \\ \nabla\Delta\rho_{24}^{12} \\ \nabla\Delta\rho_{34}^{12} \\ \nabla\Delta\rho_{12}^{13} \\ \nabla\Delta\rho_{13}^{13} \\ \nabla\Delta\rho_{14}^{13} \\ \nabla\Delta\rho_{23}^{13} \\ \nabla\Delta\rho_{24}^{13} \\ \nabla\Delta\rho_{34}^{13} \\ \nabla\Delta\rho_{12}^{23} \\ \nabla\Delta\rho_{13}^{23} \\ \nabla\Delta\rho_{14}^{23} \\ \nabla\Delta\rho_{23}^{23} \\ \nabla\Delta\rho_{24}^{23} \\ \nabla\Delta\rho_{34}^{23} \end{bmatrix} = \begin{bmatrix} 1 & -1 & 0 & 0 & -1 & 1 & 0 & 0 & 0 & 0 & 0 & 0 \\ 1 & 0 & -1 & 0 & -1 & 0 & 1 & 0 & 0 & 0 & 0 & 0 \\ 1 & 0 & 0 & -1 & -1 & 0 & 0 & 1 & 0 & 0 & 0 & 0 \\ 0 & 1 & -1 & 0 & 0 & -1 & 1 & 0 & 0 & 0 & 0 & 0 \\ 0 & 1 & 0 & -1 & 0 & -1 & 0 & 1 & 0 & 0 & 0 & 0 \\ 0 & 0 & 1 & -1 & 0 & 0 & -1 & 1 & 0 & 0 & 0 & 0 \\ 1 & -1 & 0 & 0 & 0 & 0 & 0 & 0 & -1 & 1 & 0 & 0 \\ 1 & 0 & -1 & 0 & 0 & 0 & 0 & 0 & -1 & 0 & 1 & 0 \\ 1 & 0 & 0 & -1 & 0 & 0 & 0 & 0 & -1 & 0 & 0 & 1 \\ 0 & 1 & -1 & 0 & 0 & 0 & 0 & 0 & 0 & -1 & 1 & 0 \\ 0 & 1 & 0 & -1 & 0 & 0 & 0 & 0 & 0 & -1 & 0 & 1 \\ 0 & 0 & 1 & -1 & 0 & 0 & 0 & 0 & 0 & 0 & -1 & 1 \\ 0 & 0 & 0 & 0 & 1 & -1 & 0 & 0 & -1 & 1 & 0 & 0 \\ 0 & 0 & 0 & 0 & 1 & 0 & -1 & 0 & -1 & 0 & 1 & 0 \\ 0 & 0 & 0 & 0 & 1 & 0 & 0 & -1 & -1 & 0 & 0 & 1 \\ 0 & 0 & 0 & 0 & 0 & 1 & -1 & 0 & 0 & -1 & 1 & 0 \\ 0 & 0 & 0 & 0 & 0 & 1 & 0 & -1 & 0 & -1 & 0 & 1 \\ 0 & 0 & 0 & 0 & 0 & 0 & 1 & -1 & 0 & 0 & -1 & 1 \end{bmatrix} \begin{bmatrix} \delta\rho_{11} \\ \delta\rho_{12} \\ \delta\rho_{13} \\ \delta\rho_{14} \\ \delta\rho_{21} \\ \delta\rho_{22} \\ \delta\rho_{23} \\ \delta\rho_{24} \\ \delta\rho_{31} \\ \delta\rho_{32} \\ \delta\rho_{33} \\ \delta\rho_{34} \end{bmatrix} =$$

$$= P\bar{v} \begin{bmatrix} v_{11} - v_{12} - v_{21} + v_{22} \\ v_{11} - v_{13} - v_{21} + v_{23} \\ v_{11} - v_{14} - v_{21} + v_{24} \\ v_{12} - v_{13} - v_{22} + v_{23} \\ v_{12} - v_{13} - v_{22} + v_{24} \\ v_{13} - v_{14} - v_{23} + v_{24} \\ v_{11} - v_{12} - v_{31} + v_{32} \\ v_{11} - v_{13} - v_{31} + v_{33} \\ v_{11} - v_{14} - v_{31} + v_{34} \\ v_{12} - v_{13} - v_{32} + v_{33} \\ v_{12} - v_{14} - v_{32} + v_{34} \\ v_{13} - v_{14} - v_{33} + v_{34} \\ v_{21} - v_{22} - v_{31} + v_{32} \\ v_{21} - v_{23} - v_{31} + v_{33} \\ v_{21} - v_{24} - v_{31} + v_{34} \\ v_{22} - v_{23} - v_{32} + v_{33} \\ v_{22} - v_{24} - v_{32} + v_{34} \\ v_{23} - v_{24} - v_{33} + v_{34} \end{bmatrix}$$

Examination of equation (14) reveals that an abnormally large element in the $\bar{v}$ vector is projected into several of the double differences. The observation of the large bias is confounded by the fact that each double difference is the superposition of four different non-common mode error terms. In some cases the other non-common mode error terms can actually mask the large bias term.

Specific knowledge of the elements of the $\bar{v}$ vector is not available. However, some assumptions about the statistical nature of the elements can be made. If each element, $v$, is assumed to be independently and identically distributed with some variance, $\sigma^2$, then the variance of the average of four elements is simply $\sigma^2/4$. Hence, the expected variance of the double differences (divided by 4) should be ¼ the expected variance of an individual pseudorange error. Actual observations of the double differences can be used in a hypothesis test using this assumed statistical characterization of the double differences. For example, if the pseudorange residual non-common mode errors are expected to be normally distributed with $\sigma$=0.5 meters, then the double differences should be distributed with $\sigma$=0.25 meters. In such a case, a double difference observation of 1 meter would correspond to a 4$\sigma$ event, which is highly unlikely. A detection threshold can be chosen based on the maximum allowable false error detection rate.

The independence of the terms of the $\bar{v}$ vector depends on the placement of the GPS ground station receiver 123 antennae. The largest contributors to the elements of $\bar{v}$ are the thermal noise of the tracking loop (almost certainly independent) and the multipath error. Antennae mounted close to each other may have highly correlated multipath errors. Decorrelation of multipath errors can be achieved by careful attention to the placement of antennae. Ensuring that each antennae is at a different height above the ground is one way to promote independence of multipath errors at each antennae. Physical separation horizontally, such that each antennae has a significantly different environment in terms of potential specular reflectors, also promotes the independence of multipath errors.

When a large double difference is observed, indicating a high probability of one or more large elements of the $\bar{v}$ vector, it is desirable to determine exactly which pseudorange measurement contains the large error. This can be done by multiplying the double difference vector by the transpose of the P matrix.

$$\bar{D} = P^T \nabla \Delta \rho = P^T P \delta \rho \quad (15)$$

Multiplying the double difference vector by the transpose of the P matrix results in a vector in which the elements are the sum of all the double differences that have a particular error source in common. For example, using the P matrix from equation (14) above in equation (15), the first element of the vector $\bar{D}$ is:

$$D_1 = \nabla \Delta \rho_{12}^{12} + \nabla \Delta \rho_{13}^{12} + \nabla \Delta \rho_{14}^{12} + \nabla \Delta \rho_{12}^{13} + \nabla \Delta \rho_{13}^{13} + \nabla \Delta \rho_{14}^{13} = \quad (16)$$

$$v_{11} - v_{12} - v_{21} + v_{22} + v_{11} - v_{13} - v_{21} + v_{23} +$$

$$v_{11} - v_{14} - v_{21} + v_{24} + v_{11} - v_{12} - v_{31} + v_{32} +$$

$$v_{11} - v_{13} - v_{31} + v_{33} + v_{11} - v_{14} - v_{31} + v_{34} =$$

$$6v_{11} - 2v_{12} - 3v_{21} + v_{22} - 2v_{13} + v_{23} - 2v_{14} +$$

$$v_{24} - 3v_{31} + v_{32} + v_{33} + v_{34}$$

In equation (16), the first element of the vector $\bar{D}$ is composed of all the error terms in $\bar{v}$. However, the $v_{11}$ element is multiplied by six. If $v_{11}$ included a large bias error, the first element of $\bar{D}$ would likely be larger than any other element of $\bar{D}$. Again, if all the elements of the $\bar{v}$ vector can be assumed to be identically distributed, then the distribution of the elements of $\bar{D}$ can be inferred. Observed values of the elements of $\bar{D}$ can be used in a hypothesis test based on the expected statistical distribution of the elements of $\bar{D}$. An isolation threshold is chosen based on the desired probability of missed isolation. If any element of $\bar{D}$ exceeds the isolation threshold, then the measurement corresponding to that element of $\bar{D}$ is marked as invalid and not used in the estimation of the pseudorange corrections.

If a matrix S is defined to be:

$$S = P^T P \quad (17)$$

The matrix S has two properties that make it useful for error detection. S is symmetric, (i.e., $S = S^T$) and S is idempotent ($S = S^2 = S^T S = S\ S$). Hence, S is a projection matrix. S projects the elements of $\delta\rho$ into the parity space defined by the pseudorange correction states.

Each element, $d_k$ of the observation vector $\bar{D}$ can be considered to be an observation of the non-common mode errors corresponding to a particular pseudorange. The observations are confounded by the summing of many non-common mode error terms. Nonetheless, each element of $\bar{D}$ can be considered to be made up of two parts, the desired error term (multiplied by (N–1)(M–1)) and the confounding error terms. If all the confounding error terms are assumed to be statistically independent and identically distributed with $\sigma_0$, then the distribution of the sum of the confounding error terms is $\sqrt{(NDD-1)}\sigma_0$. Given these statistical expectations on the two components of each term in $\bar{D}$, it is possible to do both error detection and error bounding.

Error detection can be performed by comparing each observation $d_k$ with a threshold set by the desired false detection probability. The desired false detection probability is in turn a function of the required continuity of function. This is a complicated relationship because detection of an error on an individual pseudorange measurement does not automatically imply a loss of function. It is possible that the pseudorange observation could be dropped from the solution with little consequence. This depends on the exact satellite constellation being used by the aircraft.

Loss of an individual pseudorange measurement results in a larger User Differential Range Error (UDRE) and Differential Range Error Bound (DREB) for the corresponding pseudorange correction. The UDRE indicates the best estimate of the 1–σ error of the differential correction. The DREB is a value expressing a probabilistic bound on the magnitude of the error of this pseudorange correction. Preferably, a $10^{-4}$ probabilistic bound is used. The probability that the differential correction is an error by more than the DREB would be less than or equal to $10^{-4}$ in this situation. Each pseudorange correction transmitted by a GPS ground station 120 is accompanied by a UDRE indication and a DREB. The aircraft data processor 110 uses the DREB for each pseudorange correction in conjunction with an observation matrix for the GPS satellites 108 currently tracked to compute a vertical or horizontal error bound for the position solution.

Given an observation $d_k$, an error bound can be computed:

$$B_i = \left( \frac{d_k + k\sqrt{(NDD-1)}}{(N-1)(M-1)} \right) \sigma_0 \qquad (18)$$

where:

N is the number of receivers;

M is the number of satellites tracked;

NDD is the number of double differences; and k is a scale factor chosen to set the probability of bounding the error. For normally distributed errors and a missed detection probability of $10^{-4}$, k=3.719.

DREB is the largest $B_i$ corresponding to a particular satellite.

The LAAS system monitors the quality of the DGPS measurement through a variety of techniques, both in the ground station and in the airplane. The error in the airplane position is ultimately bounded using a Total System Error (TSE) algorithm of the form:

$$TSE = |FTE| + NSEB(B_{ground}, B_{air}) \qquad (19)$$

where:

FTE is the observed or indicated Flight Technical Error; and

NSEB is a bound on the Navigation Sensor Error, which is a function of bounded error introduced by the airborne equipment $B_{air}$, and the bounded error of the DGPS corrections $B_{ground}$.

The airborne equipment will initiate and alarm if:

$$TSE = |FTE| + NSEB(B_{ground}, B_{air}) > T \qquad (20)$$

where:

T is the instantaneous maximum tolerable TSE.

The purpose of this algorithm is to monitor the estimated magnitude of the Total System Error (TSE=FTE+NSE) and take the appropriate action when excessive TSE is observed.

At any time the estimate of TSE is composed of FTE as observed by the airplane and an NSEB that must be derived based on information provided by the ground station and the current airborne measurements. The maximum tolerable TSE depends on many factors, including distance to go, winds, etc. Choice of the value of T will have implications on system availability and continuity.

The position error bounding terms $B_{air}$ and $B_{ground}$ are derived as follows.

Each pseudorange correction from the ground is accompanied by a User Differential Range Error (UDRE) indication and a Differential Range Error Bound (DREB). The UDRE indicates the best estimate of the 1–σ error of the differential correction. The DREB is a value expressing a $10^{-4}$ probabilistic bound on the magnitude of the error of this pseudorange correction. The probability that the differential correction is in error by more than DREB is less than or equal to $10^{-4}$. The airborne equipment then uses the DREB for each pseudorange correction in conjunction with the observation matrix H for the satellites currently tracked to compute a vertical (or horizontal) error bound for the position solution, (i.e., the probability that the magnitude of the position solution error exceeds the computed bound is less than $10^{-7}$).

The error bound is computed as follows. For each satellite a vertical bound is computed and the maximum vertical bound is used. For each satellite the vertical bound is computed:

$$VB_i = DREB_i A(3,i) + k C_i(3,3) \qquad (21)$$

where:

$VB_i$ is the vertical bound corresponding to the ith satellite;

DREB is the error bound on the pseudorange correction for the ith satellite (as supplied by the ground station); and A(3,i) is the ith column in the 3rd row (or the z row) of the pseudo inverse matrix $A = (H^T W H)^{-1} H^T W$, where W is a weighting matrix from the 1–σ UDRE and receiver measurement error values. It is a diagonal matrix with each element corresponding to the RSS of the UDRE and the receiver measurement error.

$$W = \begin{bmatrix} \frac{1}{\sqrt{\sigma_{c1}^2 + \sigma_{r1}^2}} & \cdots & 0 \\ & \frac{1}{\sqrt{\sigma_{ci}^2 + \sigma_{ri}^2}} & \\ \vdots & & \vdots \\ 0 & \cdots & \frac{1}{\sqrt{\sigma_{cN}^2 + \sigma_{rN}^2}} \end{bmatrix} \qquad (22)$$

$C_i(3,3)$ is the weighted vertical dilution of precision (VDOP). The matrix $C_i$ is computed as follows:

$$C_i = (H^T W_i H)^{-1} \qquad (23)$$

where $W_i$ is a weighting matrix from the 1–s UDRE and receiver measurement error values. It is a diagonal matrix with each element corresponding to the RSS of the UDRE and the receiver measurement error except the ith element, which contains only receiver error sigma.

$$W_i = \begin{bmatrix} \frac{1}{\sqrt{\sigma_{c1}^2 + \sigma_{r1}^2}} & & \cdots & & 0 \\ & \ddots & & & \\ & & \frac{1}{\sigma_{ri}} & & \\ & & & \ddots & \\ 0 & & \cdots & & \frac{1}{\sqrt{\sigma_{cN}^2 + \sigma_{rN}^2}} \end{bmatrix} \qquad (24)$$

where $\sigma_{ci}$ is the 1-sigma accuracy of the pseudorange correction for satellite i (given in UDRE).

$\sigma_{ri}$ is the receiver estimate of the code phase tracking error for the ith satellite measurement. (Estimated by the receiver as a function C/No etc.)

Figure 5A:
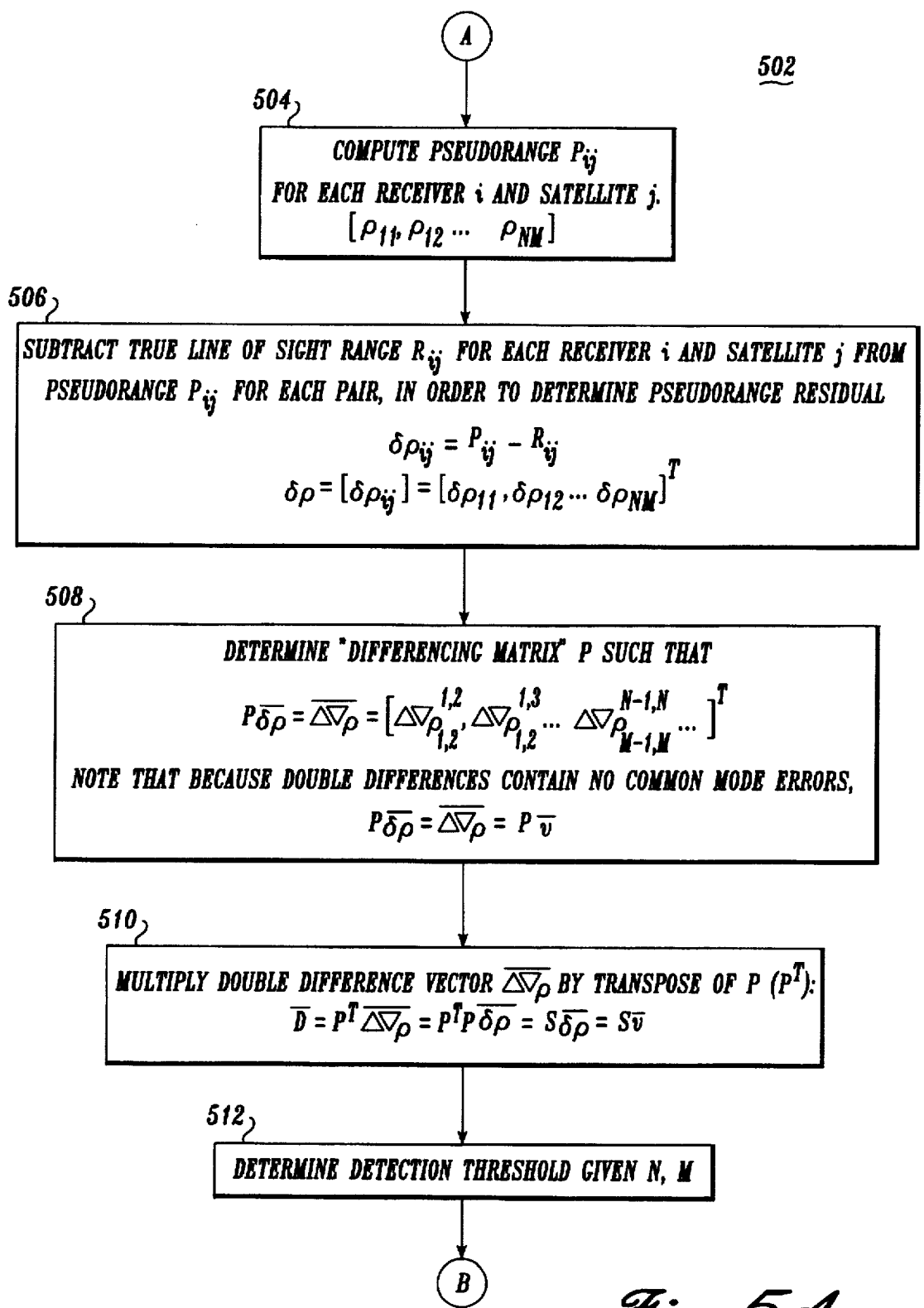
FIGS. 5A and 5B form a flow diagram illustrating the method of multiple-antennae integrity monitoring in accordance with the invention.
Figure 5B:
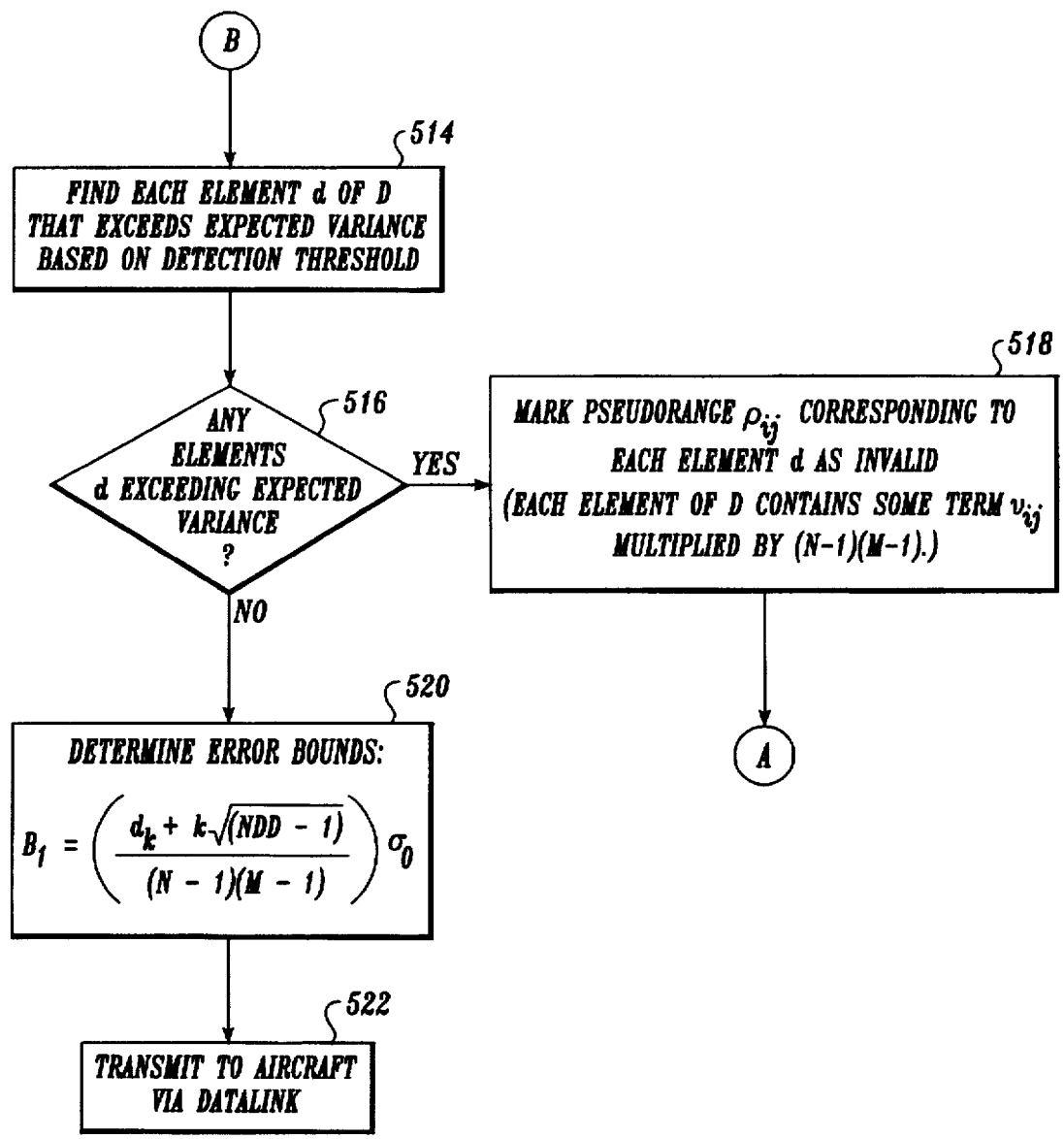

FIGS. 5A and 5B are flow diagrams illustrating the essential steps of multiple-antenna integrity monitoring 502 according to the invention, which are based on the preceding mathematical discussion. At step 504, a pseudorange is computed for each combination of GPS ground station receiver 122 and satellite 108. The resultant pseudoranges are transformed into the elements of a vector. At step 506, the true line-of-sight range for each combination of GPS ground station receiver 122 and satellite 108 is subtracted from the corresponding pseudorange, resulting in a vector consisting of a pseudorange residual for each combination. At step 508, a differencing matrix P is built such that, when the differencing matrix is multiplied by the residual pseudorange vector (step 506), the result is a double difference vector that includes a double difference for each combination of two GPS ground station receivers 122 and two satellites 108. An exemplary difference matrix P is illustrated in equation (14). At step 510, the double difference vector (step 508) is multiplied by the transpose of P ($P^T$), resulting in a vector in which the elements are the sum of all the double differences that have a particular error source in common. Substituting the projection matrix S (equation (17)) for $P^T P$ results in $S\bar{v}$.

At step 512, a detection threshold is determined based on the number of receivers and satellites, N and M. At step 514, each element of the $\bar{D}$ vector that exceeds the expected variance based on the detection threshold is found. At box 516, a decision is made of whether any elements d exceeding the expected variance have been found. If at least one such element has been found, at step 518 the pseudorange corresponding to each element d is marked as invalid. Following step 518, the process of multiple antenna integrity monitoring 502 loops back to point A, and continues at step 504.

If, at block 516, there are no elements found exceeding the expected variance, at step 520 an error bounds is determined, in accordance with equation (18). At step 522, the acceptable correction data and error bounds are transmitted to the aircraft 102 via a datalink signal 128.

Authentication and Security

A differential GPS is vulnerable to "spoofing," with potentially disastrous consequences. With reference to FIG. 1, if a false datalink signal 128 with erroneous corrections is transmitted, the aircraft receiver 106 could apply those corrections and derive an erroneous position fix.

In accordance with one aspect of the present invention, a cryptographic scheme is employed for authenticating datalink signals 128. Preferably, the cryptographic scheme employs a secure hash algorithm and a public-key cryptosystem. A secure hash algorithm is a function that creates a digest of a message, and is designed so that it is computationally infeasible to create a different message that hashes to an identical digest. Preferably, the digest is designed to be much shorter than the message. In a public-key cryptosystem, one key is used to encrypt a message and a different key is used to decrypt the encrypted message. One key is called the private key and is kept secret. The other key is called the public key and may be distributed freely. The method is designed to make it computationally infeasible to determine the private key when only the public key is known.

Figure 6:
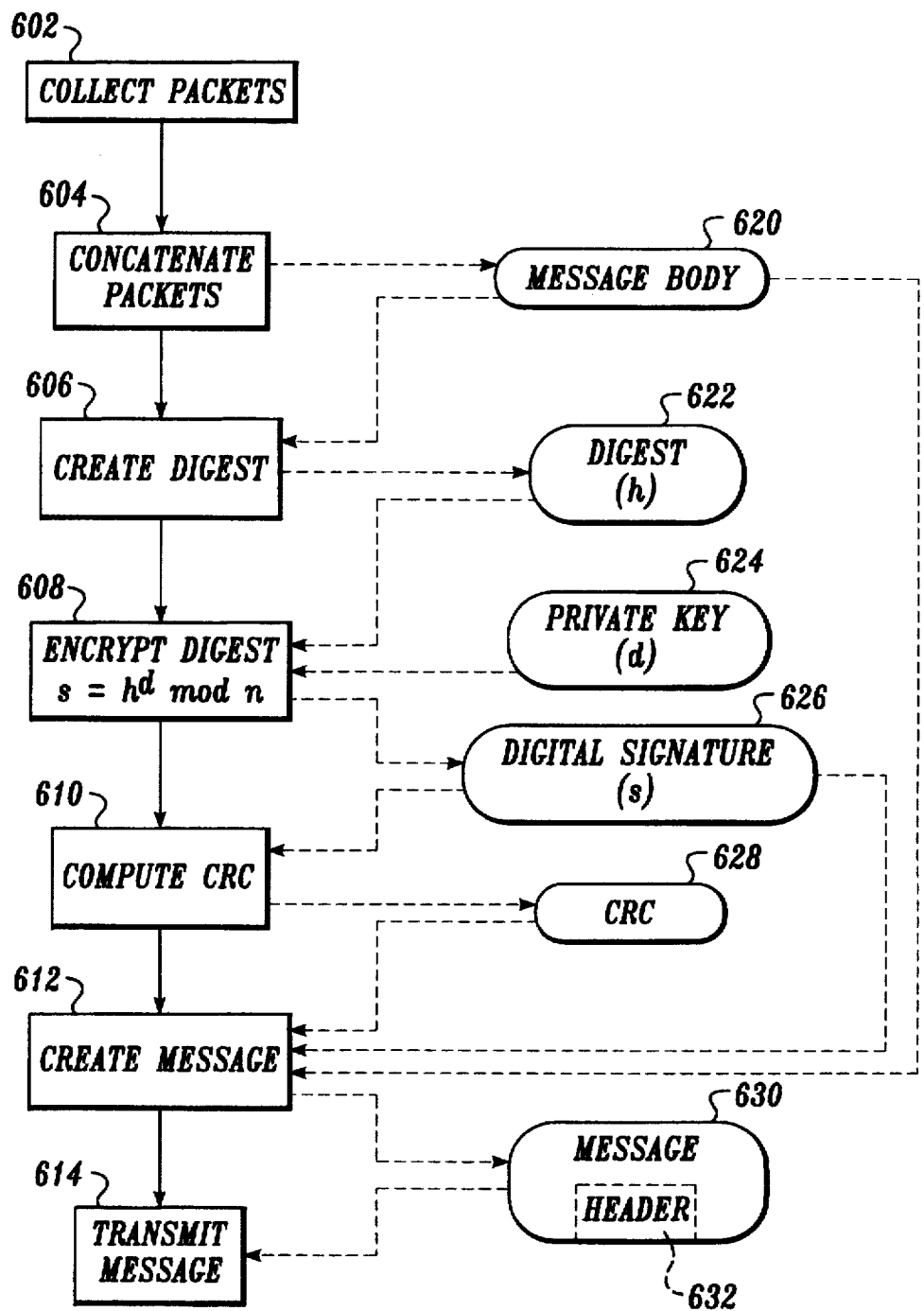
FIG. 6 is a flow diagram illustrating the process of creating digital signatures and messages within a GPS ground station in accordance with the invention.
Figure 7:
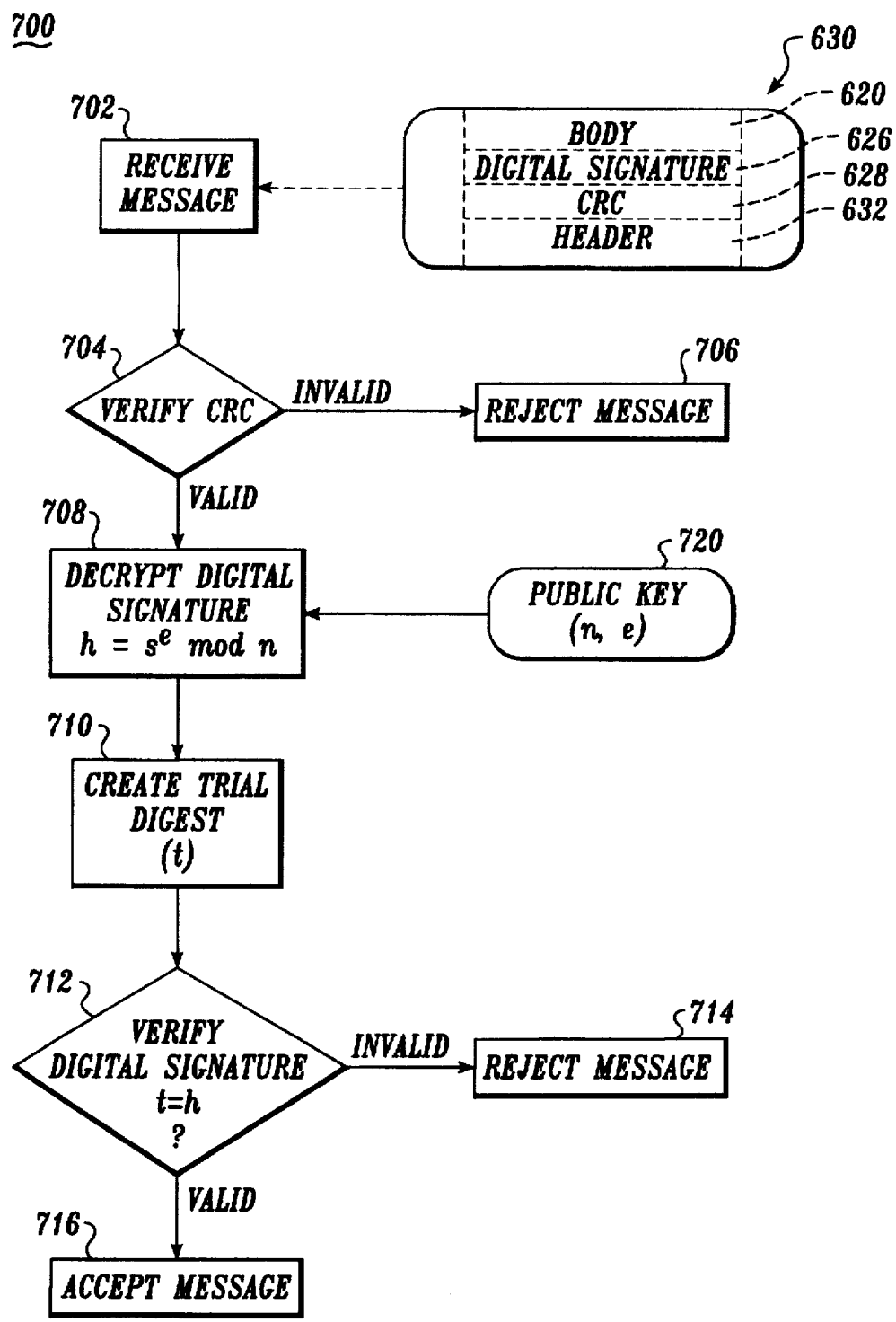
FIG. 7 is a flow diagram illustrating the verification of messages received by an aircraft in accordance with the invention.

FIGS. 6 and 7 illustrate the authentication process used by the embodiment of the invention being described here. As illustrated in FIG. 6, a digital signature is created within the GPS ground station 120 (FIG. 1) as follows. At step 602, the ground station data processor 124 collects all packets that are to be transmitted in a particular time slot. At step 604, the packets are concatenated to produce a message body 620. Using a secure hash function, the data processor 124 computes, in step 606, a digest 622 of the message body 620. The digest 622 is encrypted, in step 608, using the private key 624 and a public-key encryption algorithm, resulting in a secure digital signature 626. The security of the technique is derived from the fact that it is computationally infeasible to create a valid digital signature 626 that can be decrypted without knowing the private key 624. The private key 624 must be carefully controlled.

In step 610 a CRC is computed from the digital signature 626. Finally, at step 612, the message 630 is created from the concatenated packets that make up the message body 620, the digital signature 626, the CRC 628, and a header 632. The resultant message 630 is transmitted, in box 614, by the VHF transmitter 126 (FIG. 1), over the datalink signal 128.

As illustrated in FIG. 6, the data elements consisting of the message body 620, the digital signature 626, and the CRC 628 are combined into the message 630. The private key 624 is stored in a secure database, described below.

FIG. 7 illustrates the corresponding verification process 700 that is carried out by the aircraft data processor 110 onboard the aircraft 102 1. At step 702, the aircraft datalink receiver 116 (FIG. 1) receives the message 632 over the datalink signal 128. Referring also to FIG. 1, at step 704, the aircraft data processor 110 verifies the integrity of the message 632 as protected by the CRC 628. If a verification of the CRC indicates that the message is invalid, the aircraft data processor 110, at step 706, rejects the message 632. If, at step 704, the message is found to be valid, the process proceeds to step 708, where the aircraft data processor 110 decrypts the digital signature 626 using the public key 720 corresponding to the private key 624 used in the ground station 120. The concatenated packets that make up the message body 620 are then used, in step 710, to create a trial digest, employing the same secure hash function as the ground station employed in box 606. At step 712, a comparison is made between the trial digest created by the aircraft's data processor 110, at step 710, and the digest 622 (FIG. 6) as decrypted from the digital signature 626 (step 708). A successful comparison verifies the authenticity of the message 632, and the message is accepted (step 716). A failed comparison indicates an inauthentic message 632, and the message is rejected (step 714).

The preferred secure hash function used by the present invention is described in the National Institute of Standards and Technology FIPS Publication 180, "Secure Hash Standard," dated May 11, 1993. This function is a complex, nonlinear operation on the bits of the message. The digest 622 contains 160 bits, enough to make derivation of an impostor message infeasible given current computing capabilities. The secure hash function is designed so that there is no known method of generating an impostor message that hashes to the same digest other than by the use of brute force.

The preferred public-key cryptosystem used in the creation of a digital signature during encryption 608 and in the decryption 708 of a signature is the RSA system described in an article entitled *A Method for Obtaining Digital Signatures and Public Key Cryptosystems*, by R. L. Rivest, A. Shamir, and L. Adleman, published in *COMMUNICATIONS OF THE ACM*, Vol. 21, No. 2, p. 120 (February 1978). The use of the public-key cryptosystem makes it infeasible to generate a valid digital signature for incorrect data without possessing the private key. The system is well known in the art and is explained only briefly here.

Select two large prime numbers, p and q, and find their product, n=pq. n is referred to as the modulus. Select a number, e, such that e<n and e is relatively prime to (p−1)(q−1), and determine its inverse, d, mod((p−1)(q−1)), so that ed=1 mod((p−1)(q−1)). e and d are called the public and private exponents, respectively. The public key 720 (FIG. 7) is the pair (n,e). The private key 624 (FIG. 6) is d. The factors p and q must be kept secret, or destroyed. The public key (n,e) may be published, while the private key d must be kept secret. The numbers thus chosen have the following property:

$$hash=h=(h^d)^e \bmod n \qquad (25)$$

Products where n is larger than 500 bits ($n>2^{500}-1$) require extraordinarily large computation times. Products of 1000 bits in length are thought to be beyond factoring for the foreseeable future.

As explained above, after creating a digest 622 (step 606, FIG. 6), by computing the secure hash function of the data, h, the ground station data processor 124 creates a digital signature 626 by encrypting the digest 622 (step 608) according to the equation:

$$signature=s=h^d \bmod n \qquad (26)$$

where:

d is the private key 624 and n is the modulus, as above. As seen in FIG. 7, the aircraft data processor 110 decrypts the digital signature (step 708) according to the equation:

$$h=s^e \bmod n \qquad (27)$$

where:

e and n are the public exponent and modulus, and s is the signature 626.

The secure hash function makes it infeasible to take the digital signature 626 from one set of data and apply it to another set of data. The use of the public-key cryptography makes it infeasible to generate a valid signature for incorrect data. The inclusion of a time stamp within the message body 620 from which a digest 622 is made allows the verification process to detect whether a previously valid message has been recorded and resent, as an attempt to sabotage the system.

Figure 8:
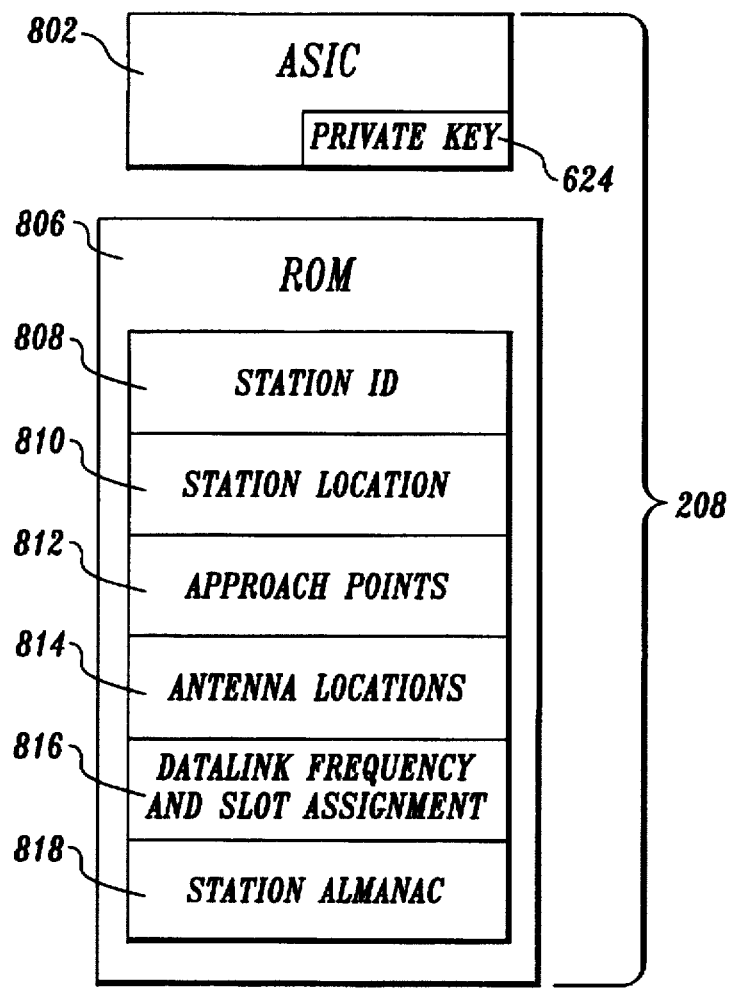
FIG. 8 is a block diagram of a secure database in accordance with the invention.

The secrecy of the private key 624 (FIG. 6) used to produce the digital signature is critical to maintain security. To protect the security of the private key 624, a ground station secure database 208, as illustrated in FIG. 8, preferably includes an application-specific integrated circuit (ASIC) 802, used to produce the digital signature for the ground station 120 (FIG. 1). The private key 624 to be used in the cryptographic process is encoded into the ASIC 802, and never leaves the ASIC. The digest 622 to be encrypted (step 608 of FIG. 6) is transmitted (arrow 210 in FIG. 2) to the secure database 208 and read by the ASIC 802. The digital signature 626 is transmitted back (arrow 212 in FIG. 2) from the secure database 208 for continued ground station processing 204. By physically securing the secure database 208, security is maintained. Even if an ASIC 802 is stolen, a thief could not obtain the private key 624 (FIG. 6). Preferably, the ASIC 802 is designed to destroy the critical data contained therein if the ASIC 802 is improperly removed from the GPS ground station 120. Techniques for building "autodestruct" ASICs are well known in the art.

In addition to a private key 624, a secure database 208 preferably contains all station-specific data in a read-only memory (ROM) device 806, which is programmed with the critical data before a ground station 120 is put into service. Subsequent changes to the secure database 208 must be carefully controlled and verified. By maintaining all station-specific data in a dedicated secure database unit 208, all other components of the ground station 120 become generic and require no programming or special setup before installation into a ground station 120. All components other than the secure database 208 can be line-replaceable units, which may be replaced without compromising the integrity of the ground station 120. As illustrated in FIG. 8, preferably, the secure database 208 includes the following station-specific information in a ROM 806.

Station ID 808: This includes an unambiguous identifier for the ground station 120.

Station location 810: Datum point defining the location of the airport.

Approach points 812: Three-dimensional points expressed in World Geodetic System 1984 (WGS-84) coordinate frame that describes usable final-approach segments.

GPS antennae location 814: The locations of all GPS antennae included in the ground station 120.

Datalink frequency and slot assignment 816: Frequency and slot assignment for datalink transmissions.

LAAS station almanac 818: List of IDs, frequency, and slot assignments of nearby ground stations 120. This is discussed in more detail below.

Ground Station Data: ALMANAC and NOTAM Messages

Figure 9:
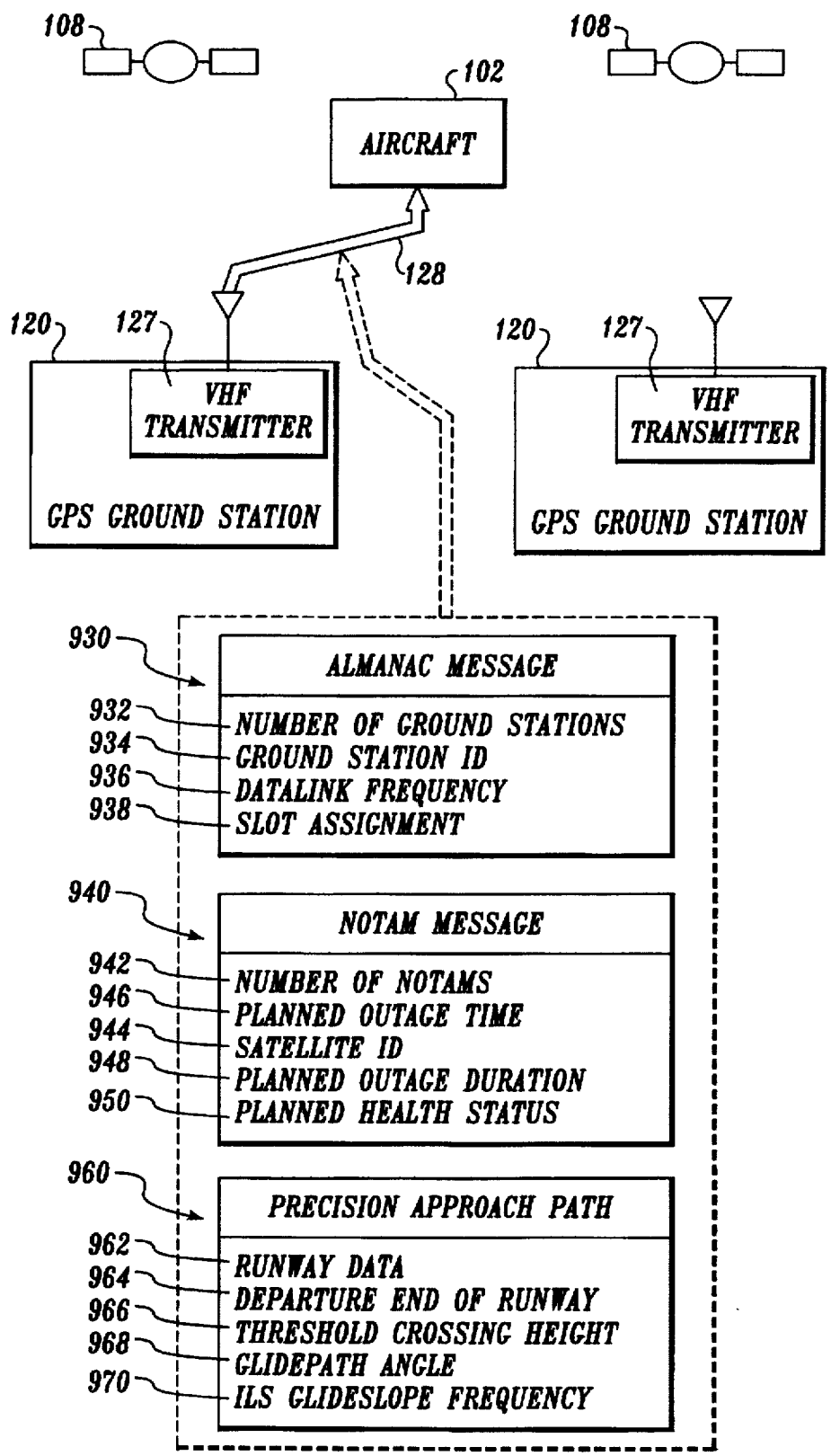
FIG. 9 is a block diagram showing the messages transmitted by a GPS ground station to an aircraft.

FIG. 9 illustrates the different types of messages transmitted by a GPS ground station 120 over the datalink 128 in accordance with the invention. These messages include ALMANAC messages and NOTAM messages.

Ground station ALMANAC messages 930 provide the information needed to facilitate the reception by the aircraft 102 of datalink signals 128 from nearby ground stations 120 1. This information is useful when the aircraft switches between coverage regions. An ALMANAC message 930 includes the following information:

Number of ground stations 932: contains the number of ground stations that are referenced within the message 930.

Ground station identifier 934.

Datalink frequency 936: contains the datalink frequency for the above-identified ground station.

Slot assignment 938: contains the slot assignment for the above-identified ground station.

NOTAM messages 940 provide status information relative to specific GPS satellites 108. Specifically, a NOTAM message 940 provides an aircraft 102 with prior notification of impending scheduled maintenance shutdowns of GPS satellites 108. Aircraft data processors 110 determine whether desired operations, such as an instrument landing, will be possible when the aircraft 102 arrives at the airport.

A NOTAM message 940 includes the following information:

Number of NOTAMs 942: Contains the number of NOTAMs included in this message.

Identifier: Identifier of GPS satellite 108 for which there is a planned shutdown.

Planned Outage Time 946: Contains the time of the planned satellite shutdown.

Planned Outage Duration 948: Contains the planned duration of the outage.

Planned Health Status 950: Contains information describing the GPS satellite 108 status during the planned maintenance.

As will be readily appreciated by one skilled in this art, and others, the contents and format of the almanac message 930 and the NOTAM message 940 illustrated in FIG. 9 should be considered as exemplary, not limiting.

The GPS ground station messages may also include a Precision Approach Path message 960. A Precision Approach Path message 960 includes the following information:

Runway data 962: Contains data identifying a specific airport and runway.

Departure end of runway 964: Contains the location of the runway departure end.

Threshold crossing height 966: Contains the height of the runway threshold crossing.

Glidepath angle 968: Contains information describing the angle of the glidepath.

ILS glideslope frequency 970: Contains information describing the frequency of the instrument landing system (ILS) glideslope transmitter 140 located at the end of the the runway (FIG. 1).

This addition creates a combined ILS/DGPS hybrid system in which horizontal guidance is derived from the DGPS data and vertical guidance is derived from the ILS data. This allows the aircraft ILS glideslope receiver 142 to be automatically tuned without pilot action.

Pseudolites

As illustrated in FIG. 1, preferably, embodiments of the invention include one or more pseudolites 130. FIG. 10 is a block diagram illustrating the major components of a pseudolite 130 formed in accordance with the invention. As illustrated in FIGS. 1 and 10, a pseudolite 130 is a ground-based station that includes a transmitter 132 that transmits ranging signals 134 similar to the ranging signals 112 transmitted by a GPS satellite 108. The GPS receiver 106 of the aircraft 102 receives the pseudolite signals 134 1. The aircraft data processor 110 determines a pseudorange to the pseudolite 130 in the same way pseudoranges to a satellite 108 are determined, i.e., by measuring the time delay between the time of transmission and the time of reception. This additional pseudorange measurement is included with pseudoranges to satellites, and used in the basic GPS multilateration.

As illustrated in FIG. 10, a pseudolite station 130 also includes a GPS time transfer receiver 131 that synchronizes a pseudolite stable time reference 1002 with GPS time. Alternatively, the pseudolite station 130 can be time synchronized with the ground station 120 via a direct connection. More specifically, the pseudolite station 130 also includes a pseudolite signal generator 1004 that produces a pseudorandom noise code modulated BPSK signal. The pseudorandom noise code modulated BPSK signal is amplitude modulated by a suitably long, e.g., 100 μsec pulse, at the best available estimate of the assigned slot time, transmitted to the GPS receiver of the aircraft by the pseudolite transmitter 132. The code phase and the burst transmission of the transmitted signal are not phase locked.

Preferably, the pseudolite transmission frequency is the same as the GPS L1 frequency (1575.42 MHz). In essence, the pseudolite signal 134 is a pseudorandom noise code BPSK modulated carrier similar to the basic GPS signals 112 except that a different code rate, preferably 10.23 MHz, is used. The pseudolite signal 134 preferably employs a Gold Code having a low cross-correlation, in order to minimize interference between signals 134 from several pseudolites. The transmissions are pulsed with a low-duty cycle pulse in order to prevent the pseudolite signals 134 from interfering with the reception of GPS satellite signals 112. Without such pulsing the likelihood of interference would be high because the power of the pseudolite signals 134 is relatively high when compared to the power of the satellites signals received by the aircraft. The burst transmissions of the pseudolite must be short enough to prevent the pseudolite signals from significantly degrading normal GPS satellite signal reception.

When an LAAS system in accordance with the invention includes more than one pseudolite 130, each pseudolite 130 is assigned a different time slot for its pulsed transmission. Preferably, the pseudolites 130 are synchronized to GPS time such that a TDMA slot transmission format can be implemented without coordination between pseudolites.

FIG. 11 illustrates a suitable multislot arrangement for use by a plurality of pseudolites. The signals transmitted by two pseudolites, designated A and B, are illustrated. Each pseudolite transmits a pulse of a predetermined number of chips, e.g., 1023, at a suitable chipping rate, 10.23 MHz, resulting in a known pulse period—100 μsec. A fixed period, e.g., 1 msec, is divided into ten slots each equal to the 100 μsec pulse period. Each pseudolite 130 transmits on every 11th slot. This corresponds to a duty cycle of 1/11, results in a pulse repetition frequency of 909.1 Hz. FIG. 11 illustrates the pulsing pattern for the two pseudolites 1A and 1B. The overall slot assignment for one of the pseudolites 1A is defined as the first slot used in the first one-millisecond period of the hour, relative to GPS time. In the example illustrated in FIG. 11, pseudolite 1A is assigned to the slot (1,1), and pseudolite 1B is assigned to the slot (1,6), where a slot (i,j) represents the jth slot of the ith millisecond of the hour. As illustrated, pseudolite 1A pulses during the slots (1,1), (2,2), (3,3) . . . (10,10), (12,1) . . . (21,10). Pseudolite 1B pulses during the slot intervals (1,6), (2,7), . . . (5,10), (7,1) . . . (16,10).

In some situations, more than one pseudolite 130 may be assigned to the same transmission slot. In order for such a configuration to function well, pseudolites assigned to the same transmission slot must be properly geographically placed so that their signals do not interfere with each other.

Referring again to FIG. 1, as noted above, preferably, the pseudolites 130 transmit a signal 134 at a relatively high power, i.e., 100 on Watts peak power. High-power signals allow the aircraft GPS receiver 106 whose antennae is mounted on top of the aircraft 102 to receive signals 134 transmitted from a pseudolite 130 located below the aircraft on airport property on the ground. High-power signals are better able to diffract around the airplane fuselage and be received by the top-mounted aircraft antennae with sufficient signal power left to support ranging, thereby avoiding the necessity of adding a bottom-mounted antennae in order for an aircraft to receive pseudolite signals 134. The utilization of pulsed power rather than low power as a means of avoiding interference with GPS satellite signals 112 allows greater freedom in the placement of pseudolite stations 130. A pseudolite 130 employing pulsed power can be placed on airport property where facilities are more convenient, rather than adjacent property where facilities are less convenient.

Referring to FIG. 1, the GPS receivers 122 of a GPS ground station 120 1 receives and tracks the pseudolite signals 134. The VHF datalink 128 transmitted by a GPS ground station 120 provides information about the location of the pseudolite 130, the assigned transmission times, the assigned code, and pseudorange corrections for the pseudolite signal 134. The ground station data processor 124 uses the pulsed pseudolite signal 134 to determine a pseudorange from the pseudolite 130. The actual range to the pseudolite 130 allows the ground station data processor 124 to compute a pseudorange correction for the pseudolite 130. The pseudolite pseudorange corrections serve as a measurement of the pseudolite time reference error. A stable time reference allows the pseudolite pseudorange corrections to be insensitive to datalink latency.

Pseudolite signals 134 do not include a data message. As shown in FIG. 10 and described above, the times of pseudolite signal transmissions are synchronized to GPS time. As shown in FIG. 11 and described above, a known slot sequence is used. An aircraft GPS receiver 106, having pseudolite 130 and ground station 120 location information, time slot information, and pseudolite pseudorange correction information to establish the pseudolite code phase, has all the information necessary to use the best available estimate of aircraft 102 position to initialize correlators when searching for the pseudolite signals 134. Well known by those skilled in the signal processing art, correlators process incoming signals in a manner that allows a weak signal to be detected in the presence of background noise.

Since the pseudolite pulses are modulated only with the pseudorandom noise sequence, the aircraft receiver 106 can integrate over the entire pulse period continuously without regard to resolving phase ambiguities introduced by data modulation. Integrating over the entire pulse period increases the available signal-to-noise ratio and enhances the potential accuracy of the system. Also, because there is no data modulation, a conventional Phase Lock Loop can be used rather than a Costas Loop. Use of a conventional phase lock loop reduces the probability of cycle slips. Preferably, the antenna of the pseudolite transmitter 132 is circularly polarized with nearly omnidirectional coverage over the upper hemisphere. Also, preferably, the antennae is placed on a choke ring or other device to reduce multipath.

Pseudolites are preferably located so that they provide the best improvement of VDOP at all of the critical ends of the runways of an airport. Because multipath interference having a differential path length greater than 1.5 times the length of one chip is rejected by the natural correlation process, pseudolites 130 are preferably located so that reflection sources will not produce differential path delays of less than 1.5 times the chip length anywhere in any final approach path served by the pseudolites 130. Using the preferred chip rate of 10.23 MHz, the length of one chip is approximately 30 meters. Based on this length, pseudolites 130 are preferably located so that reflection sources will not produce differential path delays of less than 45 meters.

Multipath links between the pseudolite 130 and the GPS ground station 120 is a constant source of bias error. Calibration utilizing the actual distance between the pseudolites 130 and the GPS ground station 120 can reduce this error.

Autonomous Scanning Mode

When operating in an autonomous scanning mode, the aircraft datalink receiver 116 automatically scans all available datalink frequencies and time slots to find datalink signals 128. This mode of operation is intended for en route, terminal area, and nonprecision approach operations. The autonomous scanning mode allows the LAAS system to operate with no pilot intervention and to provide the best-available navigation solution at all times. More specifically, the autonomous scanning mode allows the airborne user to locate and utilize datalink signals throughout all phases of flight.

Figure 12:
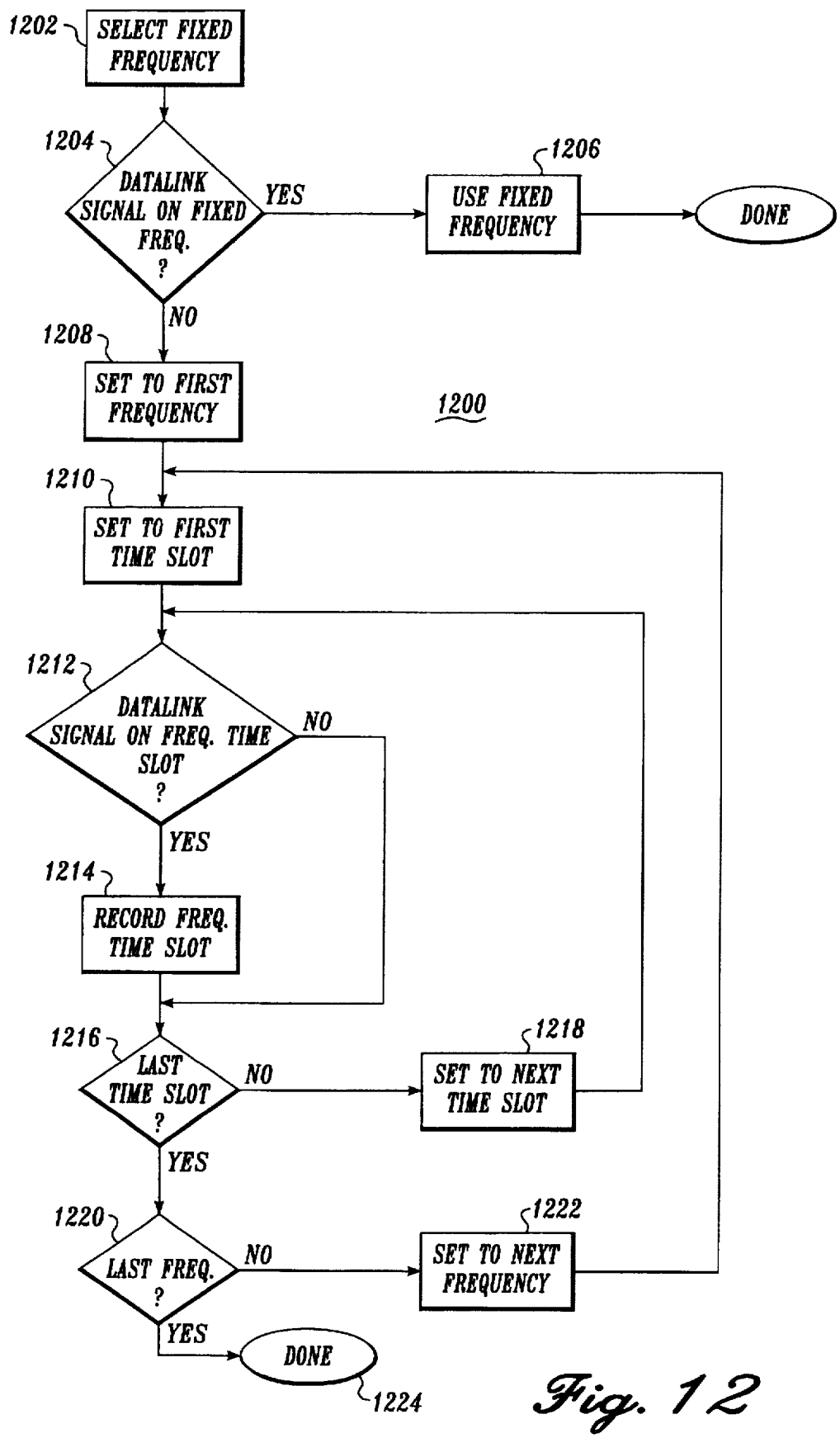
FIG. 12 is a flow diagram illustrating the process used by a datalink receiver when employing the autonomous scanning mode in accordance with the invention.

FIG. 12 is a flow diagram illustrating the process 1200 used by the aircraft datalink receiver 116 when operating in an autonomous scanning mode. Upon power-up, at step 1202, the datalink receiver 116 selects a fixed (programmable) frequency. At step 1204 a test is made to determine whether a datalink signal 128 carried on the fixed frequency is detected. If such a datalink signal is detected, the scanning process is terminated and the fixed frequency is used (step 1206). If a datalink signal is not detected at step 1204, at step 1208, the datalink receiver 116 sets its current frequency to the first frequency to be scanned. At step 1210, the datalink receiver 116 sets the current time slot to the first time slot within the current frequency. At step 1212, the datalink receiver 116 determines whether a datalink signal 128 corresponding to the current frequency and time slot settings is detected. This test requires testing whether a signal exists with the appropriate modulation format for datalink signals 128. VOR and Localizer signals may also exist in the frequency band, however, they use a substantially different modulation scheme than does the datalink signal 128. This difference allows the datalink receiver 116 to easily discriminate between a valid datalink signal 128 and nearby VOR and Localizer signals.

If a datalink signal 128 is detected, at step 1214, the current frequency and time slot are recorded, to be used later. If at step 1212, a datalink signal 128 is not detected, the frequency and time slot are not recorded. At step 1216, a test is made to determine whether this is the last of the number of time slots defined by the datalink format. If it is not the last time slot, at step 1218, the current setting is set to the next time slot 1, and the process loops back to test (step 1212) whether a datalink signal 128 is detected at that time slot. If, at step 1216, it is determined that the current time slot is the last time slot within the current frequency, at step 1220, a test is made to determine whether this is the last frequency to be scanned. If the current frequency is not the last frequency, at step 1222 the current setting is set to the next frequency to be scanned. The process then loops back to step 1210, to begin testing of all time slots within this frequency. If at step 1220, it is determined that the current frequency is the last frequency to be scanned, the process 1200 of scanning for available datalink signals 128 is complete (step 1224).

After one complete cycle of the scanning process 1200 is completed, the datalink receiver 116 repeats the entire cycle, continuing to scan all available frequencies and time slots. This enables the datalink receiver 116 to acquire new datalink signals 128 as the aircraft 102 enters and leaves specific ground station coverage regions.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A landing assistance system to provide navigation information to an aircraft, said landing assistance system including:
   (a) a plurality of satellites transmitting satellite signals containing satellite data sufficient to determine an approximate range between said aircraft and each satellite; and
   (b) at least one GPS ground station positioned at a fixed location on the ground, said GPS ground station including:
      (i) a plurality of receivers operative for receiving said satellite signals and determining pseudoranges to said satellites, said plurality of receivers determining at least four pseudoranges, each pseudorange representing an approximate distance between one receiver and one satellite and having a corresponding error representing a deviation between said pseudorange corresponding to one receiver and one satellite and an actual distance between said one receiver and said one satellite associated with said pseudorange;
      (ii) at least one data processor operative for determining differential correction information, said differential correction information determined by determining said error corresponding to each said pseudorange, each said error consisting of common mode errors and non-common mode errors, differentiating said common mode errors from said non-common mode errors, and filtering out pseudorange measurements having corresponding non-common mode errors that exceeds a threshold, said differentiation of said common mode errors from said non-common mode errors performed based on a comparison of said each error associated with said four pseudoranges; and
      (iii) a datalink transmitter operative for transmitting a datalink signal containing said differential correction information.

2. The landing assistance system of claim 1, wherein said differentiation of said common mode errors from said non-common mode errors associated with said four pseudoranges includes determining a first difference by subtracting a first error from a second error, determining a second difference by subtracting a third error from a fourth error, and determining a double difference by subtracting said first difference from said second difference.

3. The landing assistance system of claim 2, wherein one of said errors represents an error associated with a first receiver and a first satellite, another one of said errors represents an error associated with said first receiver and a second satellite, another one of said errors represents an error associated with a second receiver and said first satellite, and another one of said errors represents an error associated with said second receiver and said second satellite.

4. The landing assistance system of claim 3, wherein said filtering out pseudorange measurements includes determining a plurality of double differences and combining said plurality of double differences in a manner such that the non-common mode error associated with a particular combination of satellite and receiver is unevenly weighted in comparison with the non-common mode errors associated with different combinations.

5. The landing assistance system of claim 1, wherein said GPS ground station's data processor produces a digital signature to authenticate said GPS ground station's datalink signal containing said differential correction information, and said GPS ground station's datalink signal includes said digital signature.

6. The landing assistance system of claim 5, wherein said GPS ground station's data processor creates the digital signature by encrypting data.

7. The landing assistance system of claim 6, wherein said GPS ground station's data processor encrypts said data in accordance with a public-key cryptosystem, said GPS ground station's data processor using a private key to encrypt said data.

8. The landing assistance system of claim 7, wherein said encrypted data includes a digest of data, said digest of data formed from a transformation of data including GPS correction information.

9. The landing assistance system of claim 7, further comprising an aircraft data processor located on said aircraft, wherein said aircraft data processor utilizes a public key to decrypt said data and authenticate said digital signature.

10. The landing assistance system of claim 7, wherein said GPS ground station further comprises a secure database, wherein said secure database comprises:
    (a) read-only memory containing data pertaining to said GPS ground station comprising said secure database; and
    (b) an application-specific integrated circuit containing said private key.

11. The landing assistance system of claim 1, further comprising a first GPS ground station and a second GPS ground station, wherein said first GPS ground station transmits a datalink signal containing data representative of said second GPS ground station.

12. The landing assistance system of claim 11, wherein said first GPS ground station transmits a datalink signal containing data representative of a datalink signal frequency of said second GPS ground station.

13. The landing assistance system of claim 1, wherein said GPS ground station transmits a datalink signal containing status information representative of a status of at least one satellite.

14. The landing assistance system of claim 13, wherein said status information includes information representative of a time of shutdown of said at least one satellite.

15. The landing assistance system of claim 1, further comprising at least one pseudolite, said pseudolite positioned at a fixed location on the ground and having a transmitter for transmitting ranging signals.

16. The landing assistance system of claim 15, further comprising a first pseudolite and a second pseudolite, said first and second pseudolites positioned at respective fixed locations on the ground, said first pseudolite transmitting signals during a first time slot, said second pseudolite transmitting signals during a second time slot, wherein said first time slot occurs during a different time interval from said second time slot.

27

17. The landing assistance system of claim 16, including a plurality of pseudolites, said plurality of pseudolites synchronized so that each pseudolite transmits signals during a corresponding time slot, said each pseudolite having a unique corresponding time slot.

18. The landing assistance system of claim 15, wherein said pseudolite transmits signals using a spread spectrum code sequence transmitted with a code rate considerably above the standard GPS code rate.

19. The landing assistance system of claim 15, wherein said pseudolite transmits signals using a spread spectrum code sequence transmitted with a code rate of at least approximately 10.23 MHz.

20. The landing assistance system of claim 1, further comprising an aircraft receiver operative for receiving datalink signals transmitted from the GPS ground station, said aircraft receiver located on said aircraft, wherein said aircraft receiver scans a plurality of frequencies in order to locate a datalink signal transmitted from the GPS ground station.

21. The landing assistance system of claim 20, wherein said aircraft receiver scans a plurality of time slots in order to locate a datalink signal from the GPS ground station.

22. The landing assistance system of claim 1, wherein said GPS ground station transmits a datalink signal containing the frequency of an instrument landing system glideslope.

23. In a differential global positioning system comprising a plurality of satellites transmitting ranging signals, at least one GPS ground station having multiple receivers for receiving said ranging signals, at least one transmitter operative for transmitting datalink signals, and a data processor operative for determining differential correction information, said differential correction information determined by determining an error corresponding to each pseudorange, each said error consisting of common mode errors and non-common mode errors, an aircraft having a receiver operative for receiving said datalink signals, an improvement comprising filtering out pseudorange measurements having corresponding non-common mode errors that exceeds a threshold, differentiating the common mode errors from the non-common mode errors is based on a comparison of said each error associated with four pseudoranges, said comparison including determining a first difference by subtracting a first error from a second error, determining a second difference by subtracting a third error from a fourth error, and determining a double difference by subtracting said first difference from said second difference.

24. The system of claim 23, wherein said filtering out pseudorange measurements includes determining a plurality of double differences and combining said plurality of double differences in a manner such that the non-common mode error associated with a particular combination of satellite and receiver is unevenly weighted in comparison with the non-common mode errors associated with different combinations.

25. The system of claim 23, wherein said GPS ground station's data processor creates a digital signature by encrypting data in accordance with a public-key cryptosystem, said GPS ground station's data processor using a private key to encrypt said data.

26. The improvement of claim 25, wherein said GPS ground station further comprises a secure database, and wherein said secure database comprises:

(a) read-only memory containing data pertaining to said GPS ground station comprising said secure database; and (b) an application-specific integrated circuit containing said private key.

28

27. A method of automatically providing navigational assistance data including differential correction data, for use in a differential global positioning system employing multiple GPS satellites and at least one GPS ground station having multiple receivers, to an aircraft, the method comprising:

(a) receiving ranging signals from at least two GPS satellites, including a first GPS satellite and a second GPS satellite, said ranging signals received at a plurality of receivers, including a first receiver and a second receiver;

(b) determining, in accordance with said ranging signals, at least four unique pseudoranges between said GPS satellites and said receivers;

(c) determining, in accordance with said at least four pseudoranges and a known location of said receivers, an error corresponding to each of said pseudoranges, said error consisting of common mode errors and non-common mode errors;

(d) determining a first difference by subtracting a first error from a second error, determining a second difference by subtracting a third error from a fourth error, and determining a double difference by subtracting said first difference from said second difference, said double difference substantially consisting of non-common mode errors;

(e) combining a plurality of double differences in a manner such that the non-common mode errors associated with a particular combination of satellite and receiver are unevenly weighted in comparison with the non-common mode errors associated with different combinations of satellite and receiver;

(f) filtering out pseudoranges comprising non-common mode errors that vary from an expected value by a predetermined acceptable variation from said expected value;

(g) determining differential correction data based on pseudoranges that remain after said filtering out pseudoranges comprising said non-common mode errors that vary from said expected value by the predetermined acceptable variation from said expected value; and (h) transmitting a datalink signal containing said differential correction data.

28. The method of claim 27, wherein one of said errors represents an error associated with a pseudorange between said first receiver and said first satellite, another one of said errors represents an error associated with a pseudorange between said first receiver and said second satellite, another one of said errors represents an error associated with a pseudorange between said second receiver and said first satellite, and another one of said errors represents an error associated with a pseudorange between said second receiver and said second satellite.

29. The method of claim 28, further comprising producing a digital signature to authenticate said datalink signal containing differential correction information, and wherein said datalink signal contains said digital signature.

30. The method of claim 29, further comprising producing the digital signature by encrypting data in accordance with a public key cryptosystem, wherein said digital signature is produced by using a private key to encrypt said data.

31. The method of claim 30, further comprising: producing a digest of data formed from a transformation of data including GPS correction information; and encrypting said digest of data using said private key to form said digital signature.

32. The method of claim 30, wherein said GPS ground station includes an application-specific integrated circuit containing said private key, and said method further includes encrypting data within said application-specific integrated circuit.

33. The method of claim 27, further comprising transmitting a datalink signal containing data representative of a datalink signal corresponding to a second GPS ground station.

34. The method of claim 27, further comprising transmitting a datalink signal containing data representative of a time of shutdown of at least one of said GPS satellites.

35. The method of claim 27, wherein said at least two satellites includes a third satellite, said multiple receivers comprises at least three receivers, and said at least four pseudoranges comprises at least nine pseudoranges.

36. The method of claim 27, further comprising transmitting a datalink signal containing data representative of a signal frequency of an instrument landing system glideslope.

37. The method of claim 36, wherein the aircraft employs an instrument landing system to determine the aircraft's altitude.

* * * * *